(12) United States Patent
Ito et al.

(10) Patent No.: US 8,964,147 B2
(45) Date of Patent: Feb. 24, 2015

(54) ELECTRO-OPTIC DEVICE, METHOD OF PRODUCING ELECTRO-OPTIC DEVICE, AND PROJECTION TYPE DISPLAY APPARATUS

(75) Inventors: Satoshi Ito, Eniwa (JP); Yohei Ono, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 13/547,122

(22) Filed: Jul. 12, 2012

(65) Prior Publication Data
US 2013/0021540 A1   Jan. 24, 2013

(30) Foreign Application Priority Data

Jul. 21, 2011  (JP) ................................. 2011-159621

(51) Int. Cl.
*G02F 1/1335*  (2006.01)
*G02F 1/1333*  (2006.01)
*G03B 21/00*   (2006.01)

(52) U.S. Cl.
CPC ............ *G02F 1/1333* (2013.01); *G02F 1/1335* (2013.01); *G03B 21/006* (2013.01); *G02F 1/133345* (2013.01); *G02F 2001/133302* (2013.01)
USPC .................. 349/62; 349/5; 349/139; 349/158; 349/95; 359/618; 359/619; 359/620; 362/615

(58) Field of Classification Search
CPC ................................................. G02F 1/133553
USPC ............................ 349/62, 64, 5, 139, 158, 95
See application file for complete search history.

(56) References Cited

U.S. PATENT DOCUMENTS

| | | | | |
|---|---|---|---|---|
| 4,808,550 | A  * | 2/1989  | Fukushima | 438/427 |
| 5,994,756 | A  * | 11/1999 | Umezawa et al. | 257/510 |
| 6,493,046 | B1 * | 12/2002 | Ueda | 349/38 |
| 7,961,278 | B2 * | 6/2011  | Ohta et al. | 349/113 |
| 2004/0048076 | A1 * | 3/2004 | Nakamura et al. | 428/447 |
| 2006/0176540 | A1 * | 8/2006 | Kamijima | 359/237 |
| 2007/0165147 | A1 * | 7/2007 | Kamijima et al. | 349/38 |
| 2007/0183016 | A1 * | 8/2007 | Kamijima et al. | 359/245 |
| 2007/0200975 | A1 * | 8/2007 | Kamijima | 349/95 |
| 2010/0149443 | A1  | 6/2010 | Kumai | |
| 2010/0290250 | A1 * | 11/2010 | Toyota et al. | 362/608 |
| 2011/0140155 | A1 * | 6/2011 | Ishii | 257/98 |

FOREIGN PATENT DOCUMENTS

| | | |
|---|---|---|
| JP | 2006-189664 A | 7/2006 |
| JP | 2006-215427 A | 8/2006 |
| JP | 2006-337758 A | 12/2006 |
| JP | 2009-69729 A  | 4/2009 |
| JP | 2010-145609 A | 7/2010 |

* cited by examiner

*Primary Examiner* — Edward Glick
*Assistant Examiner* — Sang V Nguyen
(74) *Attorney, Agent, or Firm* — ALG Intellectual Property, LLC

(57) ABSTRACT

An electro-optic device is provided. In the electro-optic device, when a groove is sealed to be hollow, a sacrificial film is formed in the groove before forming a first sealing film, the first sealing film is formed, and then the sacrificial film is removed through a penetration portion of the first sealing film. A second sealing film is formed on the first sealing film, and the penetration portion of the first sealing film is blocked by the second sealing film. For this reason, it is possible to form the first sealing film to block an opening portion of the groove, and it is possible to prevent the first sealing film from being formed up to the inside of the groove.

18 Claims, 10 Drawing Sheets

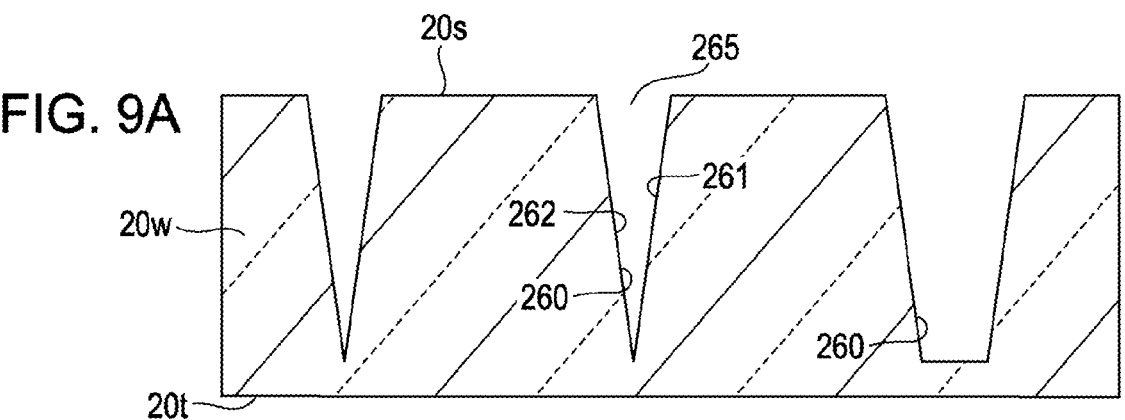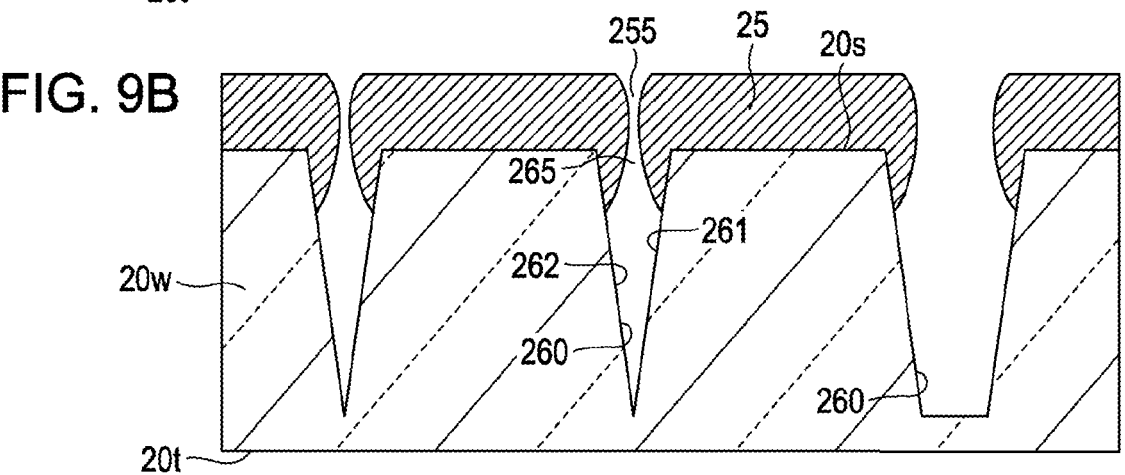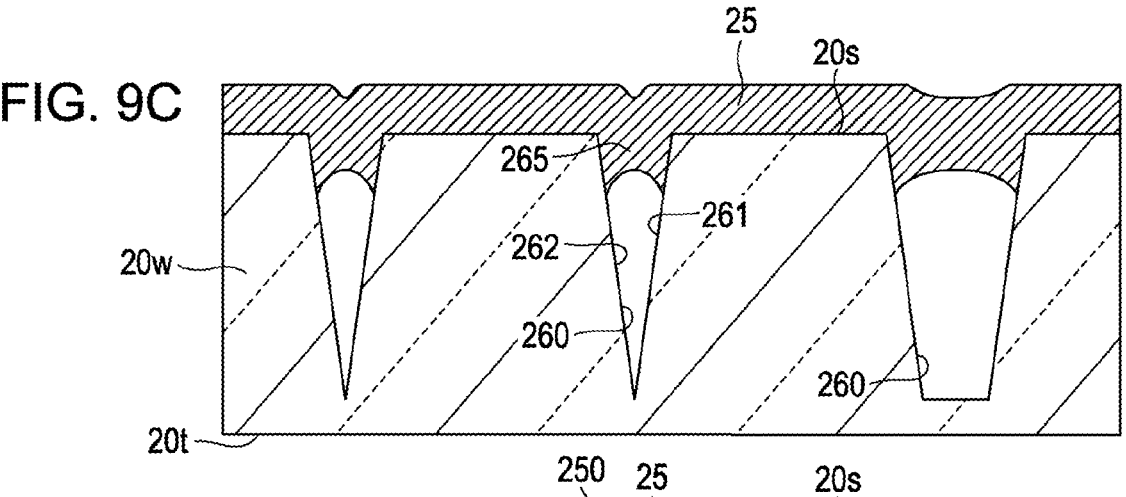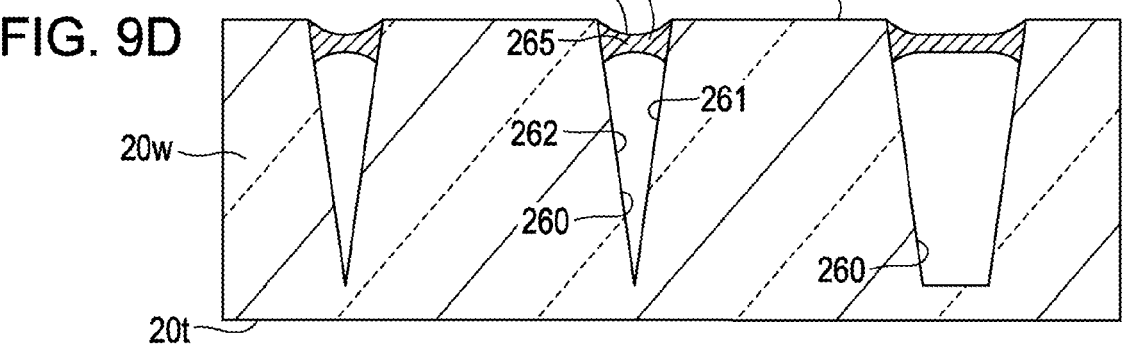

ELECTRO-OPTIC DEVICE, METHOD OF PRODUCING ELECTRO-OPTIC DEVICE, AND PROJECTION TYPE DISPLAY APPARATUS

BACKGROUND

1. Technical Field

The present invention relates to an electro-optic device such as a liquid crystal device, a method of producing the electro-optic device, and a projection type display apparatus provided with the electro-optic device.

2. Related Art

Among various electro-optic devices, a liquid crystal device includes a first substrate that is provided with a plurality of pixels and switching elements, and a second substrate that is opposed to the first substrate, and a liquid crystal layer as an electro-optic material layer is provided between the first substrate and the second substrate. Among such liquid crystal devices, in a liquid crystal device of a TN (Twisted Nematic) mode or a VA (Vertical Alignment) mode, a common electrode is formed on the second substrate, and alignment of the liquid crystal layer is controlled between the common electrode and the pixel electrodes. In the liquid crystal device, in order to efficiently guide light input from the second substrate side, to the pixel electrodes, a technique of forming a cross-sectional V-shaped groove opened to a space between the pixel electrodes on a dust-proof glass constituting a part of the second substrate, bonding a transparent cover glass to a face side to which the groove of the dust-proof glass is opened by an adhesive, and using the side faces of the hollow groove as reflection faces is proposed (see JP-A-2006-215427).

However, in the hollow groove, as described in the technique of JP-A-2006-215427, in the configuration in which the cover glass is bonded to the dust-proof glass by the adhesive to block the opening portion of the groove, there is a problem that productivity is very low.

The present inventors propose that a groove be formed on the second substrate, then a sealing film formed on the second substrate to thereby block the opening portion of the groove, and thus the groove is made hollow. However, by only forming the sealing film on the second substrate, the opening portion is only formed in an area where the opening portion is overlapped with the sealing film, and there is a problem that it is difficult to block the opening of the groove. In a case of forming the sealing film, when the sealing film is formed up to the inside of the groove, there is a problem that a part serving as the reflection faces on the side faces of the groove is significantly narrow.

SUMMARY

An advantage of some aspects of the invention is to provide an electro-optic device capable of reliably blocking an opening portion of a groove for configuring reflection portions by a sealing film formed on a substrate and capable of suppressing, as minimal as possible, side faces of the groove becoming covered with the sealing film, a method of producing the electro-optic device, and a projection type display apparatus provided with the electro-optic device.

According to an aspect of the invention, there is provided an electro-optic device including: a first substrate that is provided with a plurality of pixel electrodes and switching elements corresponding to the plurality of pixel electrodes; a second substrate that is opposed to the first substrate; and an electro-optic material layer that is provided between the first substrate and the second substrate, wherein one substrate of the first substrate and the second substrate is a transparent substrate, and wherein one substrate is provided with a hollow groove, an opening portion which is directed to a space between the pixel electrodes of the plurality of pixel electrodes that are adjacent to each other, a first sealing film that is formed to block the opening portion on a face side to which the groove is opened, the first sealing film being provided with a penetration portion communicating with an inside of the groove with an opening area smaller than that of the opening portion, and a second sealing film that is formed on the opposite face to the groove of the first sealing film to block the penetration portion.

According to another aspect of the invention, there is provided a method of producing an electro-optic device including a first substrate that is provided with a plurality of pixel electrodes and switching elements corresponding to the plurality of pixel electrodes, a second substrate that is opposed to the first substrate, and an electro-optic material layer that is provided between the first substrate and the second substrate, wherein one substrate of the first substrate and the second substrate is a transparent substrate, the method including: forming a groove, an opening portion of which is directed to a space between pixel electrodes adjacent to each other of the plurality of pixel electrodes on one substrate; forming a sacrificial film blocking the opening portion in the groove; forming a first sealing film on a face in which the groove is opened and the sacrificial film; forming a penetration portion with an opening area smaller than that of the opening portion at a position of the first sealing film overlapped with the sacrificial film; removing the sacrificial film through the penetration portion; and forming a second sealing film on the first sealing film to block the penetration portion.

In the aspect of the invention, one substrate is provided with the first sealing film and the second sealing film on the face in which the groove is opened, and the groove is hollow. For this reason, the side faces of the hollow groove are reflection faces caused by a difference in refractive index between a medium (air or vacuum) in the groove and a medium of the second substrate. Accordingly, on one substrate, it is possible to reflect light which tends to be directed to the space between the pixel electrodes by the side faces of the groove, to be directed to the pixel electrodes, and thus a ratio of the light contributing to the displaying or the like is high. The first sealing film is provided with the penetration portion having an opening area smaller than that of the opening portion and communicating with the inside of the groove. Accordingly, before forming the first sealing film, the sacrificial film is formed in the groove, then the first sealing film is formed, and it is possible to remove the sacrificial film through the penetration portion. For this reason, it is possible to form the first sealing film to block the opening portion of the groove, and it is possible to prevent the first sealing film from being formed up to the inside of the groove. Since the sacrificial film is removed, a part coming in contact with the sacrificial film on the side faces of the groove also serves as a reflection face. Therefore, it is possible to use the side faces of the groove as the reflection faces over a broad area. The opening area of the penetration portion formed in the first sealing film is smaller than that of the opening portion of the groove, and thus it is possible to block the penetration portion of the first sealing film by the second sealing film when the second sealing film is formed on the first sealing film. For this reason, by the forming the film, it is possible to make the inside of the groove hollow by blocking the opening portion of the groove. With such a configuration, productivity is high as compared with a case of bonding the cover glass to block the opening portion.

In the aspects of the invention, the first sealing film may be in an overhang state with respect to the groove, and may not be provided on the side faces of the groove. With such a configuration, it is possible to avoid a situation where the part coming in contact with the first sealing film on the side faces of the groove does not serve as the reflection faces.

In the electro-optic device, the first sealing film and the second sealing film may be formed of transparent insulating films.

In the electro-optic device, the side faces of the groove may be inclination faces inclined to the space between the pixel electrodes adjacent to each other. With such a configuration, the light which tends to be directed to the space between the pixel electrodes is reflected by the side faces, and it is possible to efficiently guide the light to the pixel electrodes.

In the electro-optic device, the inside of the groove may be in a vacuum state. With such a configuration, the side faces of the hollow groove may be used as the reflection faces with high-reflectance. The configuration may be easily realized by forming the second sealing film in a vacuum atmosphere.

In the electro-optic device, the groove may be provided on the second substrate. With such a configuration, it is possible to employ a configuration in which the light is input from the second substrate side, and there is an advantage that the light is not easily input to the switching elements.

In the electro-optic device, the pixel electrodes and the first substrate may have transparency. With such a configuration, it is possible to configure a transmission type electro-optic device.

In the method of producing the electro-optic device, in the forming of the sacrificial film, for example, the inside of the groove may be filled with a resin material as the sacrificial film.

In the method of producing the electro-optic device, in the forming of the sacrificial film, a metal film may be formed on the face to which the groove is opened, the metal film may be melted by heating to block the opening portion of the groove by the metal film, a part of the metal film formed on the outside of the groove may be removed, and a part blocking the opening portion may be allowed to remain in the groove.

The electro-optic device according to the aspect of the invention may be used in a projection type display apparatus. In this case, the projection type display apparatus includes a light source unit that outputs the light input from one substrate to the electro-optic device, and a projective optical system that perform projection of the light modulated by the electro-optic device. In the case of a projection type display apparatus, particularly, it is preferable that the efficiency of using incident light is high, and thus an effect is significant when the invention is applied to the electro-optic device.

BRIEF DESCRIPTION OF THE DRAWINGS

The invention will be described with reference to the accompanying drawings, wherein like numbers reference like elements.

FIG. 9A to FIG. 9D are diagrams illustrating a method of producing the electro-optic device according to Embodiment 2 of the invention.

DESCRIPTION OF EXEMPLARY EMBODIMENTS

Figure 1:
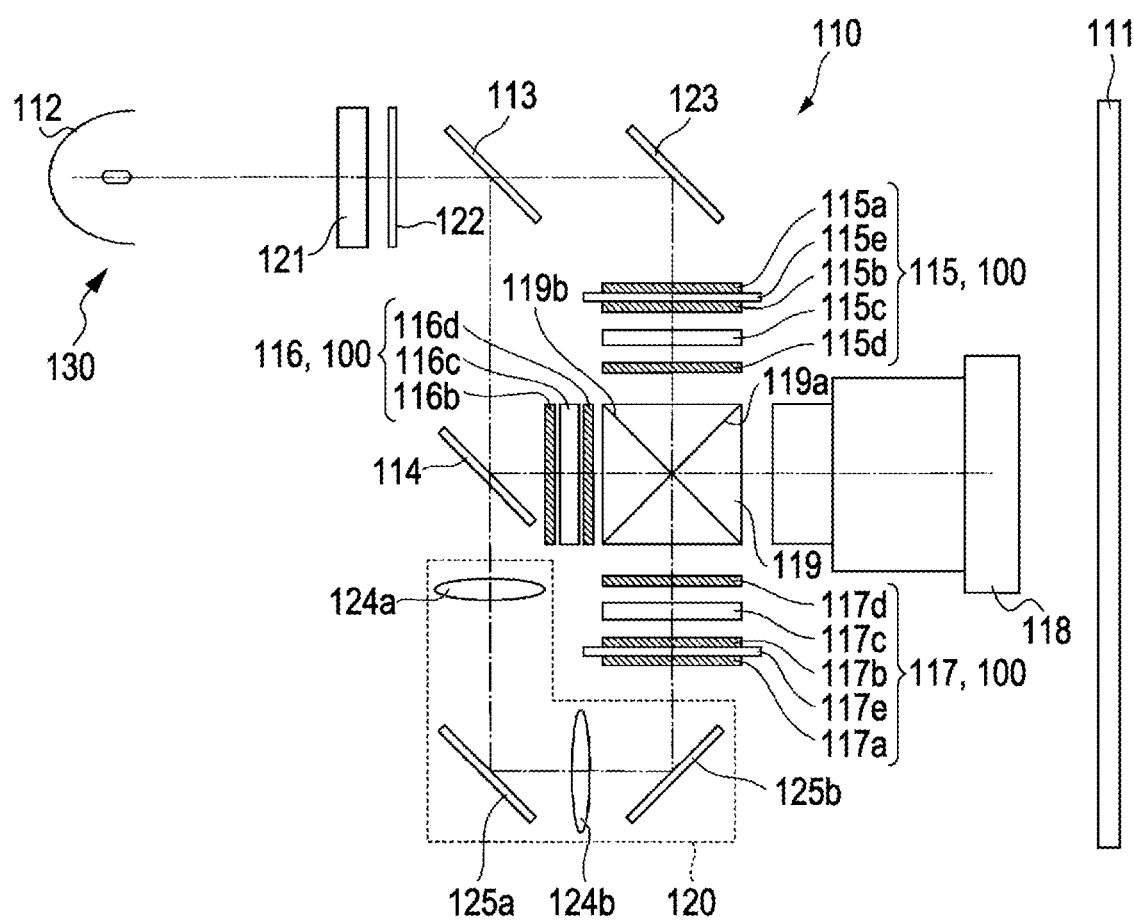
FIG. 1 is a schematic diagram illustrating a configuration of a projection type display apparatus to which the invention is applied.

A projection type display device using an electro-optic device (liquid crystal device) to which the invention is applied, the electro-optic device, and a method of producing the electro-optic device will be described with reference to the drawings. In the drawings referred by the following description, the scale of each layer and each member is different so that each layer and each member are of a size that is recognizable in the drawings.

Embodiment 1
Configuration of Projection Type Display Apparatus

A projection type display apparatus using an electro-optic device according to Embodiment 1 of the invention as a light valve will be described with reference to FIG. 1. FIG. 1 is a schematic diagram illustrating a configuration of the projection type display apparatus according to the invention.

In FIG. 1, the projection type display apparatus 110 is a so-called projection type display apparatus which irradiates a screen 111 provided on an observer side with light to observe light reflected by the screen 111. The projection type display apparatus 110 includes a light source unit 130 provided with a light source 112, dichroic mirrors 113 and 114, liquid crystal light valves 115 to 117 (electro-optic devices 100 and liquid crystal devices), a projective optical system 118, a cross-dichroic prism 119, and a relay system 120.

The light source 112 is formed of an ultrahigh pressure mercury lamp supplying light including red light, green light, and blue light. The dichroic mirror 113 allows red light from the light source 112 to pass, and reflects the green light and the blue light. The dichroic mirror 114 allows the blue light of the green light and the blue light reflected by the dichroic mirror 113 to pass, and reflects the green light. As described above, the dichroic mirrors 113 and 114 constitute a color division optical system dividing the light output from the light source 112 into red light, green light, and blue light.

An integrator 121 and a polarization conversion element 122 are disposed between the dichroic mirror 113 and the light source 112 in order from the light source 112. The integrator 121 equalizes illumination intensity of the light output from the light source 112. The polarization conversion element 122 makes the light output from the light source 112 into polarized light having a specific vibration direction such as s-polarized light.

The liquid crystal light valve 115 is a transmission type electro-optic device 100 that modulates the red light passing through the dichroic mirror 113 and reflected by a reflection mirror 123 according to an image signal. The liquid crystal light valve 115 includes a λ/2 phase difference plate 115a, a first polarization plate 115b, a liquid crystal panel 115c, and a second polarization plate 115d. When the red light input to the liquid crystal light valve 115 passes through the dichroic mirror 113, the polarization of the light is not changed, and thus the red light is the s-polarized light.

The λ/2 phase difference plate 115a is an optical element that converts the s-polarized light input to the liquid crystal light valve 115 into p-polarized light. The first polarization plate 115b is a polarization plate that blocks the s-polarized light and allows the p-polarized light to pass. The liquid crystal panel 115c converts the p-polarized light into the s-polarized light (in a case of halftone, circular polarized light or elliptical polarized light) by the modulation according to the image signal. The second polarization plate 115d is a polarization plate that blocks the p-polarized light and allows the s-polarized light to pass. Accordingly, the liquid crystal light valve 115 modulates the red light according to the image signal, and outputs the modulated red light to the cross-dichroic prism 119.

The λ/2 phase difference plate 115a and the first polarization plate 115b are disposed to come in contact with the transparent glass plate 115e which does not convert the polarized light, and it is possible to avoid that the λ/2 phase difference plate 115a and the first polarization plate 115b are warped by heat generation.

The liquid crystal light valve 116 is a transmission type electro-optic device 100 that modulates the green light reflected by the dichroic mirror 113 and then reflected by the dichroic mirror 114 according to the image signal. The liquid crystal light valve 116 includes a first polarization plate 116b, a liquid crystal panel 116c, and a second polarization plate 116d, similar to the liquid crystal light valve 115. The green light input to the liquid crystal light valve 116 is s-polarized light which is reflected and input by the dichroic mirrors 113 and 114. The first polarization plate 116b is a polarization plate that blocks the p-polarized light and allows the s-polarized light to pass. The liquid crystal panel 116c converts the s-polarized light into the p-polarized light (in a case of halftone, circular polarized light or elliptical polarized light) by the modulation according to the image signal. The second polarization plate 116d is a polarization plate that blocks the s-polarized light and allows the p-polarized light to pass. Accordingly, the liquid crystal light valve 116 modulates the green light according to the image signal, and outputs the modulated green light to the cross-dichroic prism 119.

The liquid crystal light valve 117 is a transmission type electro-optic device 100 that modulates the blue light reflected by the dichroic mirror 113, passing through the dichroic mirror 114, and then passing through the relay system 120, according to the image signal. The liquid crystal light valve 117 includes a λ/2 phase difference plate 117a, a first polarization plate 117b, a liquid crystal panel 117c, and a second polarization plate 117d, similar to the liquid crystal light valves 115 and 116. The blue light input to the liquid crystal light valve 117 is reflected by the dichroic mirror 113, passing through the dichroic mirror 114, and then reflected by two reflection mirrors 125a and 125b to be described later of the relay system 120, thereby being s-polarized light.

The λ/2 phase difference plate 117a is an optical element that converts the s-polarized light input to the liquid crystal light valve 117 into p-polarized light. The first polarization plate 117b is a polarization plate that blocks the s-polarized light and allows the p-polarized light to pass. The liquid crystal panel 117c converts the p-polarized light into the s-polarized light (in a case of halftone, circular polarized light or elliptical polarized light) by the modulation according to the image signal. The second polarization plate 117d is a polarization plate that blocks the p-polarized light and allows the s-polarized light to pass. Accordingly, the liquid crystal light valve 117 modulates the blue light according to the image signal, and outputs the modulated blue light to the cross-dichroic prism 119. The λ/2 phase difference plate 117a and the first polarization plate 117b are disposed to come in contact with the glass plate 117e.

The relay system 120 includes relay lenses 124a and 124b and reflection mirrors 125a and 125b. The relay lenses 124a and 124b are provided to prevent light loss caused by a long length of an optical path of the blue light. The relay lens 124a is disposed between the dichroic mirror 114 and the reflection mirror 125a. The relay lens 124b is disposed between the reflection mirrors 125a and 125b. The reflection mirror 125a is disposed to reflect the blue light passing through the dichroic mirror 114 and output from the relay lens 124a, to the relay lens 124b. The reflection mirror 125b is disposed to reflect the blue light output from the relay lens 124b, to the liquid crystal light valve 117.

The cross-dichroic prism 119 is a color synthesis optical system in which two dichroic films 119a and 119b are orthogonally disposed in an X shape. The dichroic film 119a is a film that reflects the blue light and allows the green light to pass, and the dichroic film 119b is a film that reflects the red light and allows the green light to pass. Accordingly, the cross-dichroic prism 119 synthesizes the red light, green light, and blue light modulated by the liquid crystal light valves 115 to 117, respectively, and outputs the synthesized light to the projective optical system 118.

The light input from the liquid crystal light valves 115 to 117 to the cross-dichroic prism 119 is s-polarized light, and the light input from the liquid crystal light valve 116 to the cross-dichroic prism 119 is p-polarized light. Since the light input to the cross-dichroic prism 119 is different kinds of polarized light, it is possible to synthesize the light input from the liquid crystal light valves 115 to 117 to the cross-dichroic prism 119. Generally, the dichroic films 119a and 119b are excellent in reflection transistor characteristics of s-polarized light. For this reason, the red light and blue light reflected by the dichroic films 119a and 119b are the s-polarized light, and the green light passing through the dichroic films 119a and 119b is the p-polarized light. The projective optical system 118 has a projection lens (not shown), which projects the light synthesized by the cross-dichroic prism 119 to the screen 111.

In the projection type display apparatus 110 configured as described above, efficiency of using the light output from the light source 112 is required to be high, and thus the electro-optic devices 100 as the liquid crystal light valves 115 to 117 employs a configuration to be described hereinafter.

Overall Configuration of Electro-optic Device 100

Figure 2A:
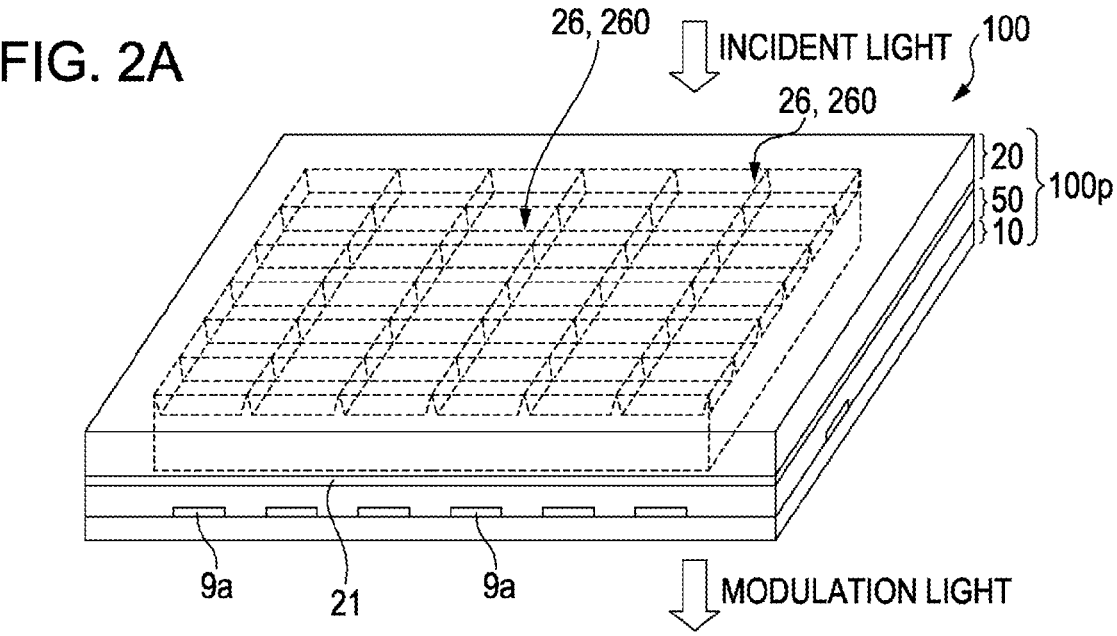
FIG. 2A and FIG. 2B are diagrams illustrating a basic configuration of a liquid crystal panel used in a liquid crystal light valve (electro-optic device/liquid crystal device) in the projection type display apparatus shown in FIG. 1.
Figure 2B:
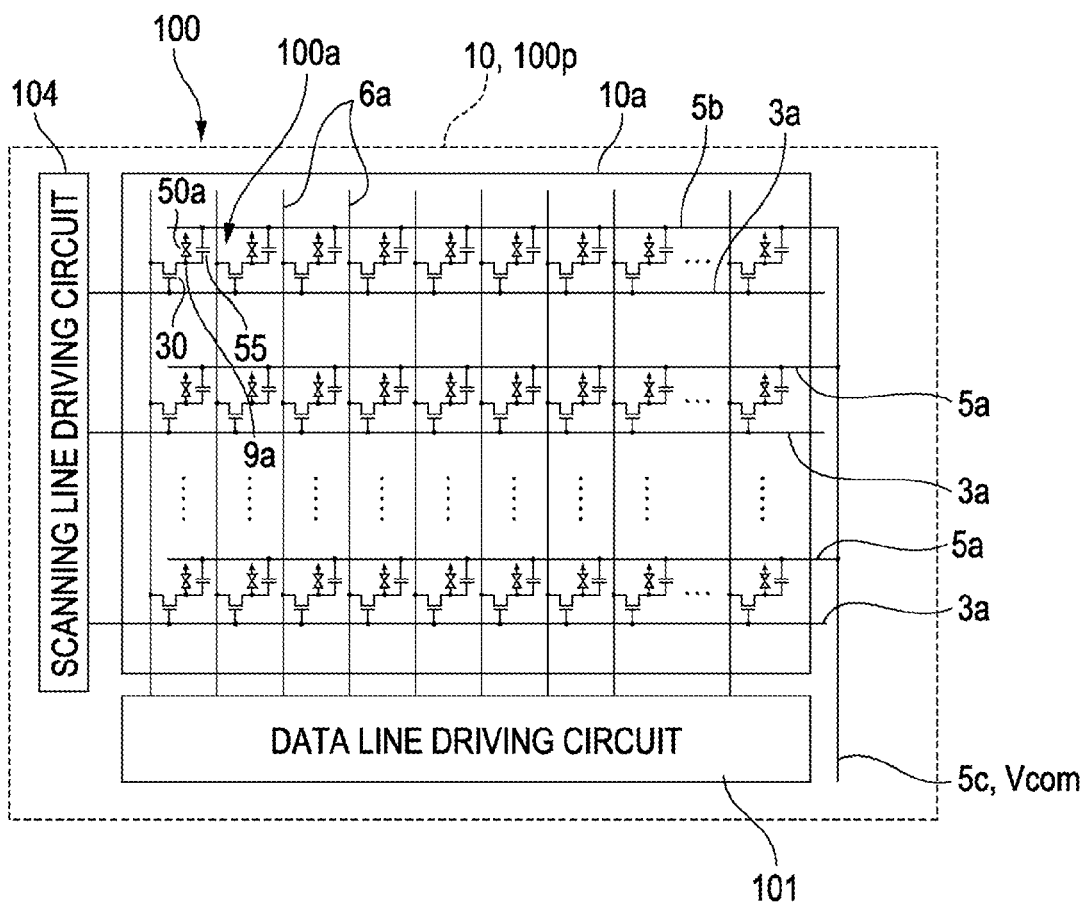

FIG. 2A and FIG. 2B are diagrams illustrating a basic configuration of a liquid crystal panel used in the liquid crystal light valves (electro-optic devices 100/liquid crystal devices) in the projection type display apparatus shown in FIG. 1, and FIG. 2A and FIG. 2B are a schematic diagram illustrating a basic structure of the liquid crystal panel and a block diagram illustrating an electrical configuration of the electro-optic device 100. The liquid crystal light valves 115 to 117 and the liquid crystal panels 115c to 117c shown in FIG. 1 only differ in wavelength areas of modulated light, and have a common basic configuration. Accordingly, the liquid crystal light valves 115 to 117 will be described as the electro-optic devices 100, and the liquid crystal panels 115c to 117c will be described as the liquid crystal panels 100p.

As shown in FIG. 2A, the electro-optic device 100 has the liquid crystal panel 100p of a TN (Twisted Nematic) mode and a VA (Vertical Alignment) mode. The liquid crystal panel 100p includes a first substrate 10, and a second substrate 20 opposed to the first substrate 10, and is a transmission type liquid crystal panel modulating the light input from the second substrate 20 side and outputting the light from the first substrate 10 side. The first substrate 10 and the second substrate 20 are combined and opposed through a seal member (not shown), and a liquid crystal layer 50 (electro-optic material layer) is kept in an inner area of the seal member. Although they will be described later in detail, island-shaped pixel electrodes 9a are formed on the face side of the first substrate 10 opposed to the second substrate 20, and a common electrode 21 is formed substantially on the whole face thereof on the face side of the second substrate 20 opposed to the first substrate 10. The second substrate 20 is provided with a reflection portion 26 using a groove 260 to be described later.

As shown in FIG. 2B, in the electro-optic device 100 of the embodiment, the liquid crystal panel 100p is provided with an image display area 10a (pixel area) in which a plurality of pixels 100a are arranged in a matrix at the center area thereof. In the liquid crystal panel 100p in the first substrate 10 (see FIG. 2A, FIG. 2B, and the like), a plurality of data lines 6a and a plurality of scanning lines 3a are vertically and horizontally arranged in the image display area 10a, and the pixels 100a are provided at positions corresponding to intersection points thereof. Each of the plurality of pixels 100a is provided with a pixel transistor 30 (switching element) formed of a field-effect transistor and the pixel electrode 9a (see FIG. 2A, FIG. 2B, and the like). A source of the pixel transistor 30 is electrically connected to the data line 6a, a gate of the pixel transistor 30 is electrically connected to the scanning line 3a, and a drain of the pixel transistor 30 is electrically connected to the pixel electrode 9a.

The first substrate 10 is provided with a scanning line driving circuit 104 and a data line driving circuit 101 on the outer peripheral side from the image display area 10a. The data line driving circuit 101 is electrically connected to the data lines 6a, and sequentially supplies image signals supplied from an image processing circuit, to the data lines 6a. The scanning line driving circuit 104 is electrically connected to the scanning lines 3a, and sequentially supplies scanning signals to the scanning lines 3a.

In each pixel 100a, the pixel electrode 9a is opposed with the common electrode 21 (see FIG. 2A, FIG. 2B, and the like) formed on the second substrate 20 and the liquid crystal layer 50, and constitutes a liquid crystal capacitance 50a. To each pixel 100a, an accumulation capacitance 55 is added in parallel to the liquid crystal capacitance 50a to prevent the image signal kept in the liquid crystal capacitance 50a from fluctuating. In the embodiment, to constitute the accumulation capacitance 55, a first electrode layer 5a is formed as a capacitance electrode layer over the plurality of pixels 100a. In the embodiment, the first electrode layer 5a is electrically connected to a common potential line 5c to which common potential Vcom is applied.

Example of Specific Configuration of Electro-optic Device 100

Figure 3A:
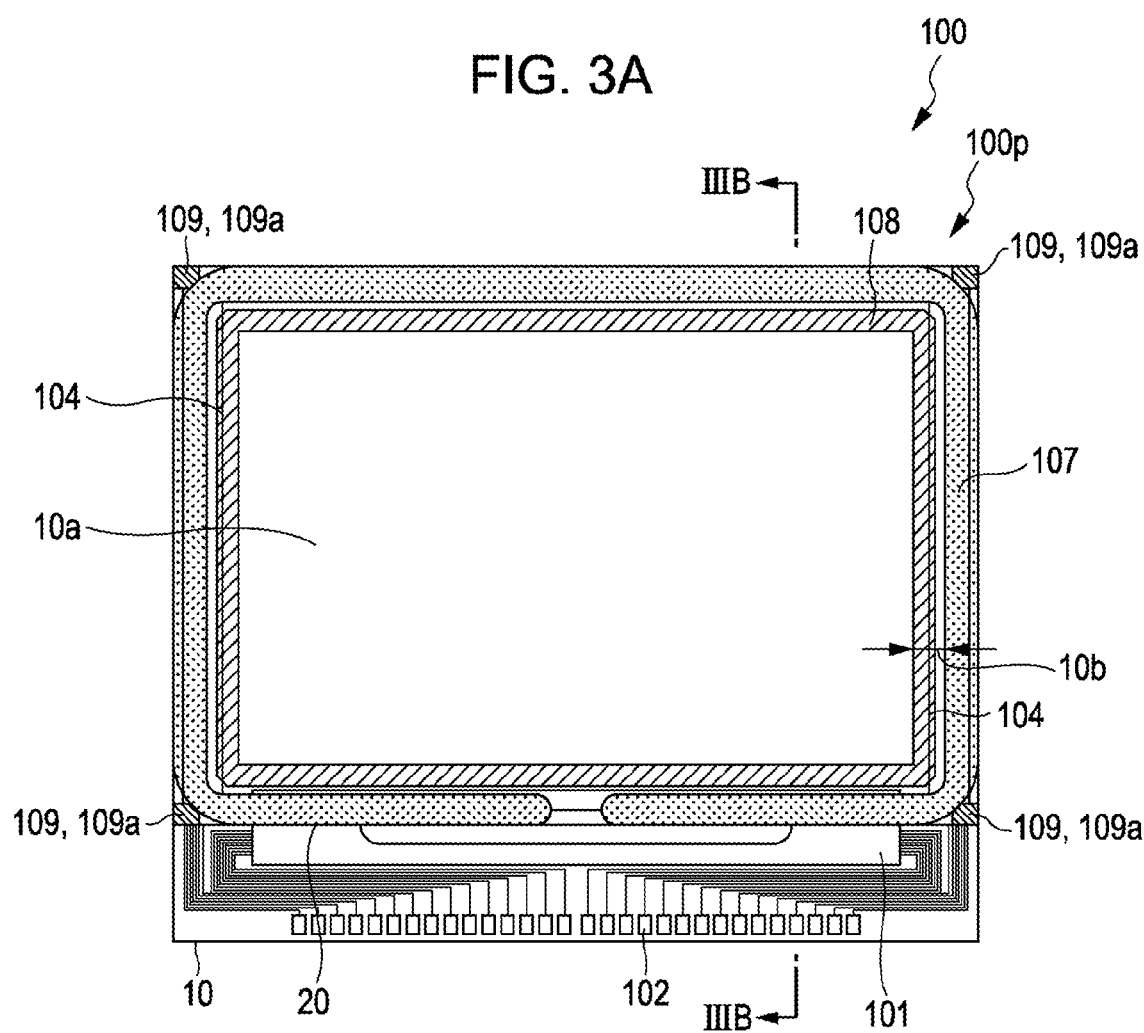
FIG. 3A and FIG. 3B are diagrams illustrating an example of a specific configuration of the liquid crystal panel used in the electro-optic device according to Embodiment 1 of the invention.
Figure 3B:
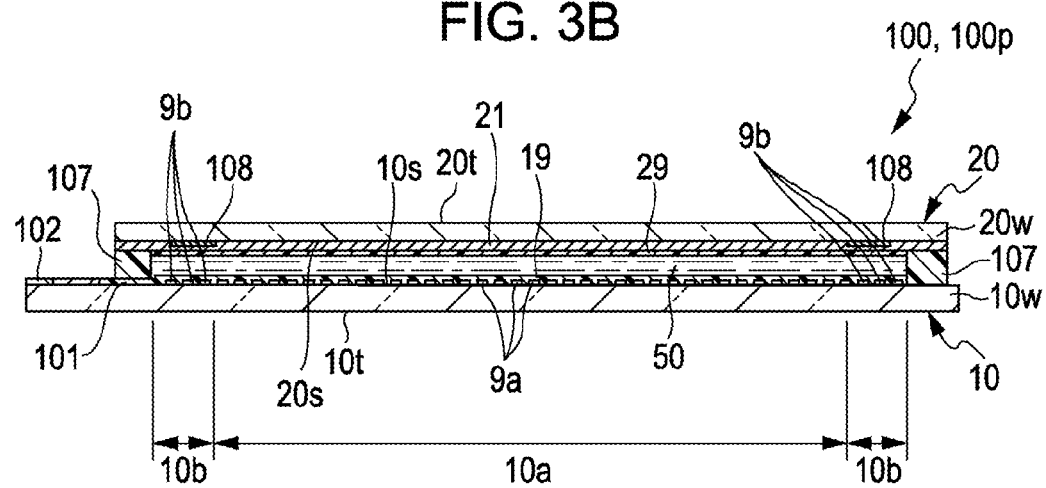

FIG. 3A and FIG. 3B are diagrams illustrating an example of a specific configuration of the liquid crystal panel 100p used in the electro-optic device 100 according to Embodiment 1 of the invention, and FIG. 3A and FIG. 3B are a plan view of the liquid crystal panel 100p viewed from the second substrate side together with constituent elements, and a cross-sectional view taken along line IIIB-IIIB. In FIG. 3B, the reflection portion 26 to be described later is not shown.

As shown FIG. 3A and FIG. 3B, in the liquid crystal panel 100p, the first substrate 10 and the second substrate 20 are combined by a seal member 107 through a predetermined gap, and the seal member 107 is provided in a frame shape along an outer frame of the second substrate 20. The seal member 107 is an adhesive agent formed of light-curable resin, heat-curable resin, or the like, and a gap member such as a glass fiber or a glass bead for making a distance between both substrates to be a predetermined value is combined.

In the liquid crystal panel 100p with such a configuration, both of the first substrate 10 and the second substrate 20 are rectangular, the image display area 10a described with reference to FIG. 2A and FIG. 2B is provided as a rectangular area substantially at the center of the liquid crystal panel 100p. The seal member 107 is also provided substantially in a rectangular shape corresponding to the shape described above, and a substantially rectangular peripheral area 10b is provided in a frame shape between an inner peripheral edge of the seal member 107 and an outer peripheral edge of the image display area 10a. In the first substrate 10, the data line driving circuit 101 and a plurality of terminals 102 are formed along one side of the first substrate 10 on the outside of the image display area 10a, and the scanning line driving circuit 104 is formed along the other side adjacent to one side. The terminal 102 is connected to a flexible wiring board (not shown), and various kinds of potential and various signals are input to the first substrate 10 through the flexible wiring board.

Although will be described later in detail, the pixel transistors 30 described with reference to FIG. 2B and the pixel electrodes 9a electrically connected to the pixel transistors 30 are formed in matrix in the image display area 10a on one face 10s side between one face 10s and the other face 10t of the first substrate 10, and an alignment film 19 is formed on an upper layer side of the pixel electrodes 9a.

Dummy pixel electrodes 9b (see FIG. 3B) formed together with the pixel electrode 9a are formed in the peripheral area 10b on one side 10s of the first substrate 10. In the dummy pixel electrodes 9b, a configuration of electrically connecting to dummy pixel transistors, a configuration of directly and electrically connecting to connection lines without providing the dummy pixel transistors, or a configuration of a floating state in which potential is not applied are employed. When the face on which the alignment film 19 is formed on the first substrate 10 is planarized by polishing, the dummy pixel electrode 9b compresses the height position of the image display area 10a and the peripheral area 10b and contributes to make the face on which the alignment film 19 is formed to be a flat face. When the dummy pixel electrode 9b is set to predetermined potential, it is possible to prevent disarray of alignment of liquid crystal molecules at the end portion of the outer peripheral side of the image display area 10a.

The common electrode 21 is formed on one face 20s opposed to the first substrate 10 between one face 20s and the other face 20t of the second substrate 20, and the alignment film 29 is formed on the upper layer of the common electrode 21. The common electrode 21 is formed over the plurality of pixels 100a substantially on the whole face of the second substrate 20 or as a plurality of stripe-shaped electrodes. In the embodiment, the common electrode 21 is formed substantially on the whole face of the second substrate 20. A frame-shaped light shield layer 108 is formed along the outer periphery of the image display area 10a on one face 20s of the second substrate 20, and the light shield layer 108 serves as a closeout. The outer periphery of the light shield layer 108 is positioned across a gap from the inner peripheral edge of the seal member 107, and the light shield layer 108 and the seal member 107 are not overlapped with each other.

In the liquid crystal panel 100p with such a configuration, an inter-substrate connection electrode 109 for electrical connection between the first substrate 10 and the second substrate 20 is formed in an area overlapped with angular parts of the second substrate 20 on the outside from the seal member 107 on the first substrate 10. The inter-substrate connection electrode 109 is provided with an inter-substrate connection member 109a including conductive particles, and the common electrode 21 of the second substrate 20 is electrically connected to the first substrate 10 side through the inter-substrate connection member 109a and the inter-substrate connection electrode 109. For this reason, the common potential Vcom is applied from the first substrate 10 side to the common electrode 21. The seal member 107 has substantially the same width dimension, and is provided along the outer periphery of the second substrate 20. For this reason, the seal member 107 is substantially rectangular. The seal member 107 is provided avoiding the inter-substrate connection electrode 109 and passing through the inside in an area overlapped with the angular parts of the second substrate 20, and the angular parts of the seal member 107 are substantially arc.

In the electro-optic device 100 with such a configuration, when the pixel electrodes 9a and the common electrode 21 are formed by a transparent conductive film such as ITO (Indium Tin Oxide) or IZO (Indium Zinc Oxide), it is possible to configure a transmission type liquid crystal device. When the common electrode 21 is formed by a transparent conductive film such as ITO and IZO and the pixel electrodes 9a are formed by a reflective conductive film such as aluminum, it is possible to configure a reflection type liquid crystal device. When the electro-optic device 100 is the reflection type, the light input from the second substrate 20 side is modulated while the light is reflected by the substrate of the first substrate 10 side and is output, thereby displaying an image. When the electro-optic device 100 is the transmission type, the light input from one side substrate between the first substrate 10 and the second substrate 20 is modulated while the light passes through the other side substrate and is output, thereby displaying an image.

The electro-optic device 100 may be used as a color display device of an electronic apparatus such as a mobile computer and a mobile phone. In this case, a color filter (not shown) and a protective film are formed on the second substrate 20. In the electro-optic device 100, a phase difference film, a polarization plate, or the like is disposed in a predetermined direction with respect to the liquid crystal panel 100p according to the kind of liquid crystal layer 50 used or a normally white mode and a normally black mode.

In the embodiment, the electro-optic devices 100 are used as light valves for RGB in the projection type display apparatus (liquid crystal projector) described with reference to FIG. 1. In this case, light of colors divided through dichroic mirrors for RGB color division is input as projection light to each of the electro-optic devices 100 for RGB, and thus a color filter is not formed.

Hereinafter, a case where the electro-optic device 100 is the transmission type liquid crystal device and the light input from the second substrate 20 passes through the first substrate 10 and is output will be mainly described. In the embodiment, a case where the electro-optic device 100 is provided with the liquid crystal panel 100p of a VA mode using a nematic liquid crystal compound, dielectric anisotropy of which is negative, as the liquid crystal layer 50 will be mainly described.

Specific Configuration of Pixel

Figure 4A:
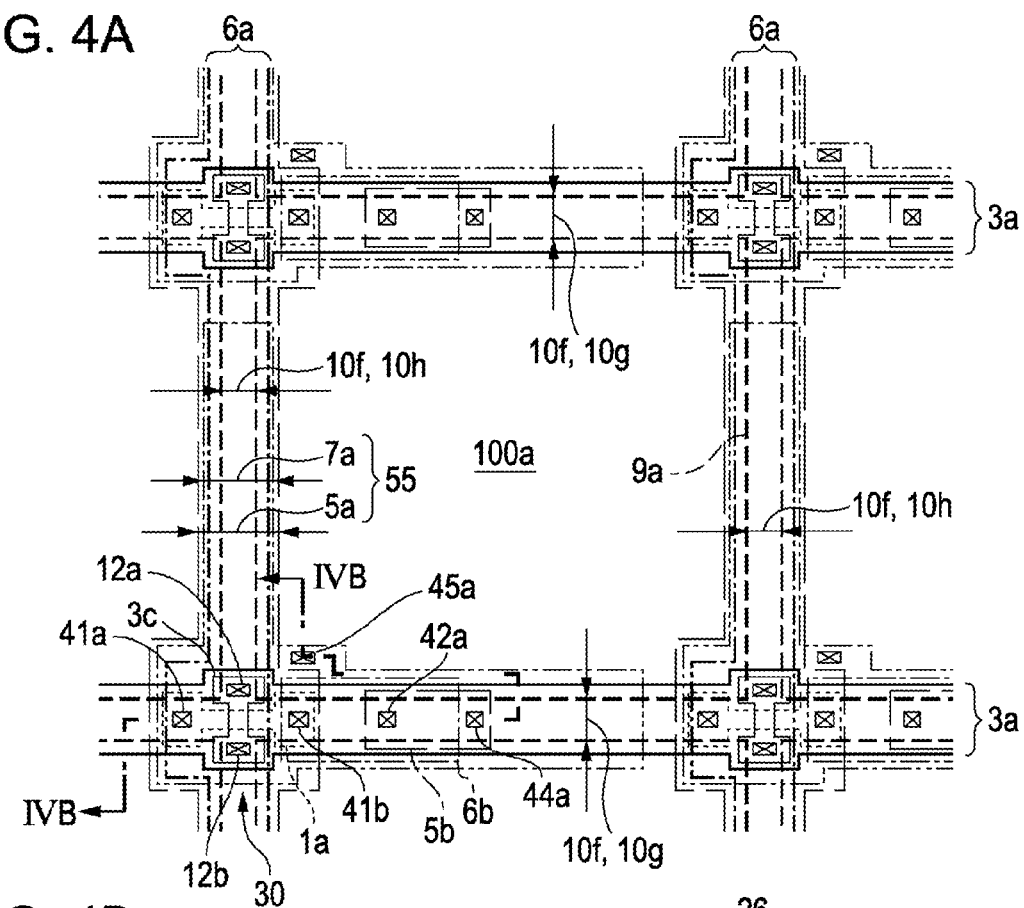
FIG. 4A and FIG. 4B are diagrams illustrating a pixel of the electro-optic device of Embodiment 1 of the invention.
Figure 4B:
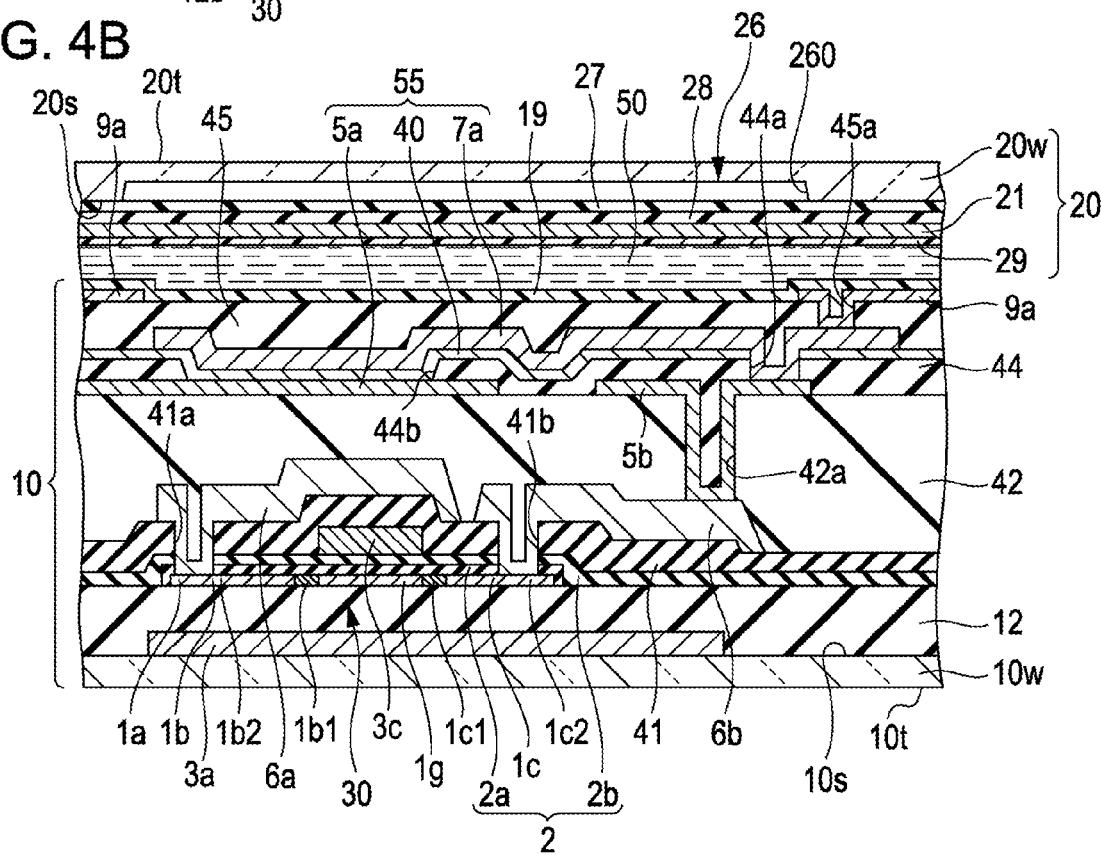

FIG. 4A and FIG. 4B are diagrams illustrating the pixels of the electro-optic device 100 according to Embodiment 1 of the invention, and FIG. 4A and FIG. 4B are a plan view of pixels adjacent to each other in the first substrate 10, and a cross-sectional view when the electro-optic device 100 is cut at a position corresponding to the line IVA-IVA of FIG. 4A. In FIG. 4A, areas are represented by the following lines.
Scanning Line 3a: Thick Solid Line
Semiconductor Layer 1a: Thin and Short Dot Line
Data Line 6a and Drain Electrode 6b: Chain Line
First Electrode Layer 5a and Relay Electrode 5b: Thin and Long Broken Line
Second Electrode Layer 7a: Two-dot Chain Line
Pixel Electrode 9a: Thick Short Broken Line As shown in FIG. 4A, on the first substrate 10, the plurality of pixels 100a are provided with the rectangular pixel electrodes 9a, the data lines 6a and the scanning lines 3 are formed along the area overlapped with a vertical and horizontal inter-pixel area 10f interposed by the pixel electrodes 9a adjacent to each other. More specifically, the scanning lines 3a extend along the area overlapped with the first inter-pixel area 10g extending along the scanning lines 3a in the inter-pixel area 10f, and the data lines 6a extend along the area overlapped with the second inter-pixel area 10h extending along the data lines 6a. The data lines 6a and the scanning lines 3a linearly extend, and the pixel transistors 30 are formed in the areas where the data lines 6a and the scanning lines 3a intersect with each other. On the first substrate 10, the first electrode layer 5a (capacitance electrode layer) described with reference to FIG. 2B is formed to be overlapped with the data lines 6a.

As shown in FIG. 4A and FIG. 4B, the first substrate 10 mainly includes a transparent substrate body 10w such as a quartz substrate and a glass substrate, a pixel electrode 9a formed on the surface (one face 10s side) of the liquid crystal layer 50 side of the substrate body 10w, a pixel transistor 30 for pixel switching, and an alignment film 19. The second substrate 20 mainly includes a transparent substrate body 20w such as a quartz substrate and a glass substrate, a common electrode 21 formed on the surface (one face 20s side opposed to the first substrate 10) of the liquid crystal layer 50 side, and an alignment film 29.

In the first substrate 10, the scanning lines 3a formed of a conductive film such as a conductive polysilicon film, a metal silicide film, a metal film, and a metal film compound are formed on one face 10s side of the substrate body 10w. In the embodiment, the scanning line 3a is formed of a light shield film such as tungsten silicide (WSi), and also serves as a light shield conductive film with respect to the pixel transistor 30. In the embodiment, the scanning line 3a is formed of tungsten silicide with a thickness of about 200 nm. An insulating film such as a silicon oxide film may be provided between the substrate body 10w and the scanning lines 3a.

On one face 10s side of the substrate body 10w, an insulating film 12 such as a silicon oxide film is formed on the upper layer side of the scanning lines 3a, and the pixel transistor 30 provided with the semiconductor layer 1a is formed on the surface of the insulating film 12. In the embodiment, the insulating film 12 has, for example, a 2-layer structure of a silicon oxide film formed by a decompression CVD method using tetraethoxysilane ($Si(OC_2H_5)_4$) and a plasma CVD method using tetraethoxysilane and oxygen gas, and a silicon oxide film (HTO (High Temperature Oxide) film) formed by a high temperature CVD method.

The pixel transistor 30 is provided with the semiconductor layer 1a directed to a long side direction in an extending direction of the scanning line 3a in the intersection area of the scanning line 3a and the data line 6a, and a gate electrode 3c extending in a direction perpendicular to a length direction of the semiconductor layer 1a and overlapped with a center part in a length direction of the semiconductor layer 1a. The pixel transistor 30 has a transparent gate insulating layer 2 between the semiconductor layer 1a and the gate electrode 3c. The semiconductor layer 1a is provided with a channel area 1g opposed through the gate insulating layer 2 with respect to the gate electrode 3c, and is provided with a source area 1b and a drain area 1c on both sides of the channel area 1g. In the embodiment, the pixel transistor 30 has an LDD structure. Accordingly, the source area 1b and the drain area 1c are provided with low-concentration areas 1b1 and 1c1 on both sides of the channel area 1g, respectively, and are provided with high-concentration areas 1b2 and 1c2 in an area adjacent on the opposite side to the channel area 1g with respect to the low-concentration areas 1b1 and 1c1, respectively.

The semiconductor layer 1a is configured by a polycrystalline silicon film or the like. The gate insulating layer 2 has a 2-layer structure of a first gate insulating layer 2a formed of a silicon oxide film obtained by thermally oxidizing the semiconductor layer 1a, and a second gate insulating layer 2b formed of a silicon oxide film or the like formed by a CVD method or the like. The gate electrode 3c is formed of a conductive film such as a conductive polysilicon film, a metal silicide film, a metal film, and a metal film compound, and is electrically connected to the scanning lines 3a through contact holes 12a and 12b passing through the second gate insulating layer 2b and the insulating film 12 on both sides of the semiconductor layer 1a. In the embodiment, the gate electrode 3c has a 2-layer structure of a conductive polysilicon film with a film thickness of about 100 nm and a tungsten silicide film with a film thickness of about 100 nm.

In the embodiment, the scanning line 3a is formed by the light shield film to prevent an erroneous operation from occurring, in which the erroneous operation is caused by optical current in the pixel transistor 30 by inputting the reflected light to the semiconductor layer 1a when the light after passing through the electro-optic device 100 is reflected by the other member. However, the scanning lines are formed on the upper layer of the gate insulating layer 2, and a part thereof may be the gate electrode 3c. In this case, the scanning line 3a shown in FIG. 4A and FIG. 4B is formed only to block the light.

A transparent interlayer insulating film 41 formed of a silicon oxide film is formed on the upper layer side of the gate electrode 3c, and the data line 6a and the drain electrode 6b are formed on the upper layer of the interlayer insulating film 41 by the same conductive film. The interlayer insulating film 41 is formed of a silicon oxide film or the like formed by a plasma CVD method using, for example, silane gas ($SiH_4$) and nitrous oxide ($N_2O$).

The data line 6a and the drain electrode 6b are formed of a conductive film such as a conductive polysilicon film, a metal silicide film, a metal film, and a metal film compound. In the embodiment, the data line 6a and the drain electrode 6b have a 4-layer structure formed by laminating a titanium (Ti) film with a film thickness of 20 nm, a titanium nitride (TiN) film with a film thickness of 50 nm, an aluminum (Al) film with a film thickness of 350 nm, and a TiN film with a film thickness of 150 nm in this order. The data line 6a is electrically connected to the source area 1b (data line side source drain area) through the contact hole 41a passing through the interlayer insulating film 41 and the second gate insulating layer 2b. The drain electrode 6b is formed to be partially overlapped with the drain area 1c (pixel electrode side source drain area) of the semiconductor layer 1a in the area overlapped with the first inter-pixel area 10g, and is electrically connected to the drain area 1c through the contact hole 41b passing through the interlayer insulating film 41 and the second gate insulating layer 2b.

A transparent interlayer insulating film 42 formed of a silicon oxide film or the like is formed on the upper layer side of the data line 6a and the drain electrode 6b. The interlayer insulating film 42 is formed of, for example, a silicon oxide film or the like formed by the plasma CVD method or the like using tetraethoxysilane and oxygen gas.

The first electrode layer 5a and the relay electrode 5b are formed on the upper layer side of the interlayer insulating film 42 by the same conductive film. The first electrode layer 5a and the relay electrode 5b are formed of a conductive film such as a conductive poly silicon film, a metal silicide film, a metal film, and a metal film compound. In the embodiment, the first electrode layer 5a and the relay electrode 5b has a 2-layer structure of an Al film with a film thickness of about 200 nm and a TiN film with a film thickness of about 100 nm. The first electrode layer 5a extends along an area overlapped with the second inter-pixel area 10h similar to the data line 6a. The relay electrode 5b is formed to be partially overlapped with the drain electrode 6b in an area overlapped with the first inter-pixel area 10g, and is electrically connected to the drain electrode 6b through the contact hole 42a passing through the interlayer insulating film 42.

An interlayer insulating film 44 such as a silicon oxide film is formed as an etching stopper layer on the upper layer side of the first electrode layer 5a and the relay electrode 5b, and an opening portion 44b is formed on the interlayer insulating film 44 in the area overlapped with the first electrode layer 5a. In the embodiment, the interlayer insulating film 44 is formed of a silicon oxide film or the like formed by the plasma CVD method or the like using tetraethoxysilane and oxygen gas. Although not shown in FIG. 4A, the opening portion 44b is formed in an L shape provided with a part extending along the area overlapped with the first inter-pixel area 10g in which the intersection area of the data line 6a and the scanning line 3a is a base point, and a part extending along the area overlapped with the second inter-pixel area 10h in which the intersection area of the data line 6a and the scanning line 3a is a base point.

A transparent dielectric layer 40 is formed on the upper layer side of the interlayer insulating film 44, and a second electrode layer 7a is formed on the upper layer side of the dielectric layer 40. The second electrode layer 7a is formed of a conductive film such as a conductive polysilicon film, a metal silicide film, a metal film, and a metal film compound. In the embodiment, the second electrode layer 7a is formed of a TiN film with a film thickness of about 100 nm. As the dielectric layer 40, a silicon compound such as a silicon oxide film and a silicon nitride film may be used, and a dielectric layer with a high-dielectric constant such as an aluminum oxide film, a titanium oxide film, a tantalum oxide film, a niobium oxide film, a hafnium oxide film, a lanthanum oxide film, and a zirconium oxide film may be used. The second electrode layer 7a is formed in an L shape provided with a part extending along the area overlapped with the first inter-pixel area 10g in which the intersection area of the data line 6a and the scanning line 3a is a base point, and a part extending along the area overlapped with the second inter-pixel area 10h in which the intersection area of the data line 6a and the scanning line 3a is a base point. Accordingly, in the second electrode layer 7a, the part extending along the area overlapped with the second inter-pixel area 10h is overlapped with the first electrode layer 5a through the dielectric layer 40 with respect to the opening portion 44b of the interlayer insulating film 44. As described above, in the embodiment, the first electrode layer 5a, the dielectric layer 40, and the second electrode layer 7a constitute an accumulation capacitance 55 in the area overlapped with the first inter-pixel area 10g.

In the second electrode layer 7a, the part extending along the area overlapped with the first inter-pixel area 10g is partially overlapped with the relay electrode 5b, and is electrically connected to the relay electrode 5b through the contact hole 44a passing through the dielectric layer 40 and the interlayer insulating film 44.

A transparent interlayer insulating film 45 is formed on the upper layer side of the second electrode layer 7a, and the pixel electrode 9a formed of a transparent conductive film such as an ITO film with a thickness of about 140 nm is formed on the upper layer side of the interlayer insulating film 45. The pixel electrode 9a is partially overlapped with the second electrode layer 7a in the vicinity of the intersection area of the data line 6a and the scanning line 3a, and is electrically connected to the second electrode layer 7a through the contact hole 45a passing through the interlayer insulating film 45.

An alignment film 19 is formed on the surface of the pixel electrode 9a. The alignment film 19 is formed of a resin film such as a polyimide resin or an oblique vapor deposition film such as a silicon oxide film. In the embodiment, the alignment film 19 is an inorganic alignment film (vertical alignment film) formed of an oblique vapor deposition film such as $SiO_x$ (x<2), $SiO_2$, $TiO_2$, MgO, $Al_2O_3$, $In_2O_3$, $Sb_2O_3$, and $Ta_2O_5$.

In the second substrate 20, the common electrode 21 formed of a transparent conductive film such as an ITO film is formed on the surface (face on the side opposed to the first substrate 10) of the liquid crystal layer 50 side of the transparent substrate body 20w such as a quartz substrate or a glass substrate, and the alignment film 29 is formed to cover the common electrode 21. Similarly to the alignment film 19, the alignment film 29 is formed of a resin film such as a polyimide resin or an oblique vapor deposition film such as a silicon oxide film. In the embodiment, the alignment film 29 is an inorganic alignment film (vertical alignment film) formed of an oblique vapor deposition film such as $SiO_x$ (x<2), $SiO_2$, $TiO_2$, MgO, $Al_2O_3$, $In_2O_3$, $Sb_2O_3$, and $Ta_2O_5$. The alignment films 19 and 29 are formed by vertically depositing nematic liquid crystal compounds in which dielectric anisotropy is negative used in the liquid crystal layer 50, and the liquid crystal panel 100p operates as a normally black VA mode.

The substrate body 20w of the second substrate 20 is provided with the reflection portion 26 provided with a groove 260 to be described hereinafter with reference to FIG. 5A, FIG. 5B, and the like, and the common electrode 21 or the alignment film 29 is formed on the first substrate 10 side in the reflection portion 26.

Specific Configuration of Second Substrate 20

Figure 5A:
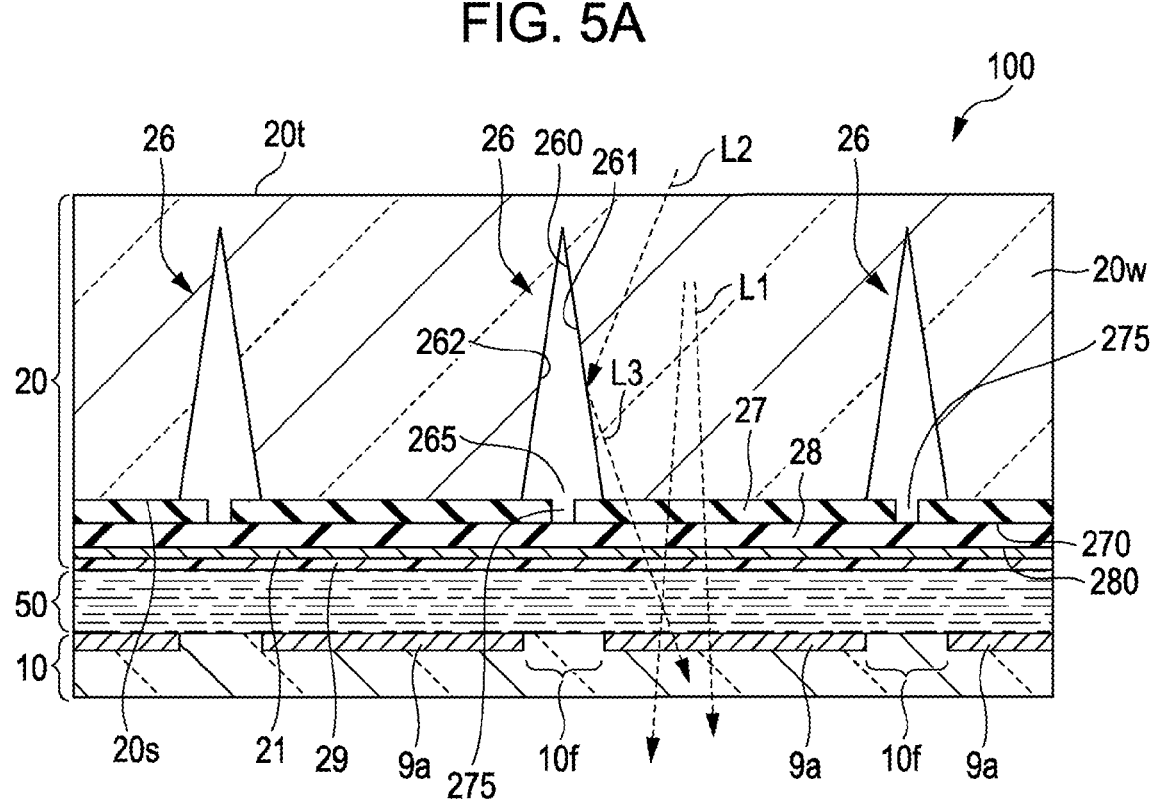
FIG. 5A and FIG. 5B are diagrams illustrating a reflection portion formed on a second substrate of the electro-optic device according to Embodiment 1 of the invention.
Figure 5B:
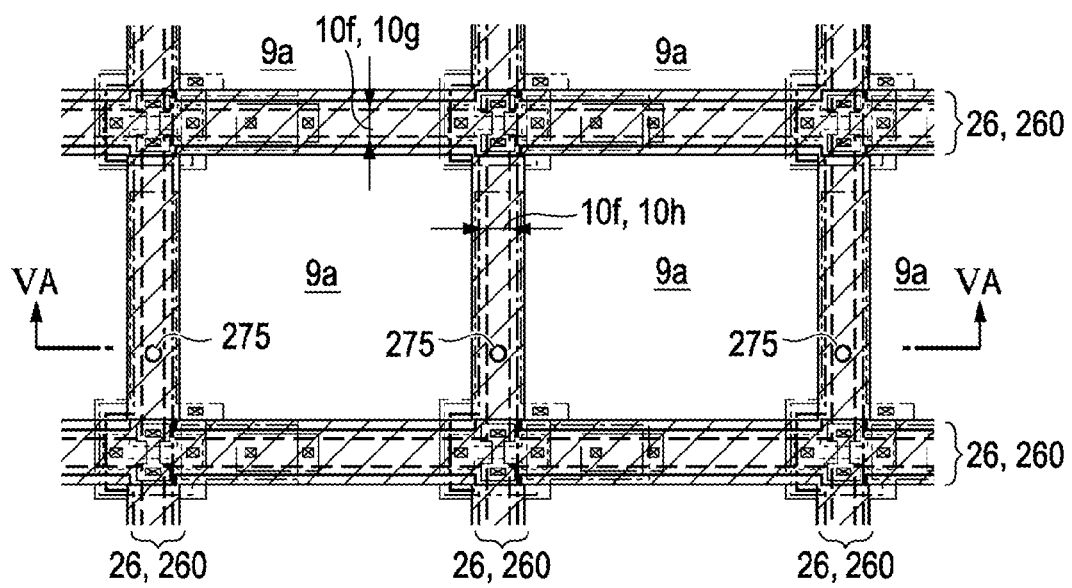

FIG. 5A and FIG. 5B are diagrams illustrating the reflection portion formed on the second substrate 20 of the electro-optic device 100 according to Embodiment 1 of the invention, and FIG. 5A and FIG. 5B are a cross-section view illustrating the second substrate 20 and a diagram illustrating a plan configuration of the reflection portion. In FIG. 5A, the alignment film 19 and the like on the first substrate 10 side are not shown. FIG. 5A corresponds to the cross-section of VA-VA of FIG. 5B.

As shown in FIG. 5A and FIG. 5B, in the electro-optic device 100 of the embodiment, the light input from the second substrate 20 side is optically modulated for each pixel by the liquid crystal layer 50, and then is output from the first substrate 10. For this reason, to efficiently use the incident light, it is necessary to efficiently guide the incident light toward the pixel electrode 9a. In the embodiment, the reflection portion 26 reflecting the light which tends to be directed to the space (inter-pixel area 10f) between the pixel electrodes 9a of the light input from the second substrate 20 side, to the pixel electrodes 9a is formed.

In the embodiment, the reflection portion 26 is provided with the groove 260 with a lattice shape extending along the area overlapped with the space (the inter-pixel area 10f) between the pixel electrodes 9a in the plan view, on one face 20s side of the substrate body 20w (transparent substrate) of the second substrate 20, and the groove 260 is opened toward the inter-pixel area 10f. In the embodiment, the side faces 261 and 262 of the groove 260 opposed to each other are inclined toward the inter-pixel area 10f, and the groove 260 has a cross-sectional V shape. More specifically, the groove 260 has a substantially isosceles triangular cross section in which the side faces 261 and 262 are one side, and an apex of the triangle is positioned at the center of the width direction of the inter-pixel area 10f. The width dimension (the length of the bottom side of the triangle) of the groove 260 is set to be substantially equal to the width dimension of the inter-pixel area 10f or slightly larger than the width dimension thereof.

In the embodiment, the opening portion 265 of the groove 260 is blocked by the first sealing film 27 and the second sealing film 28 formed on one face 20s of the substrate body 20w, and the inside of the groove 260 is hollow. In the embodiment, both of the first sealing film 27 and the second sealing film 28 are formed of a transparent insulating film such as a silicon oxide film.

The first sealing film 27 is formed to block the opening portion 265 on one face 20s of the substrate body 20w to which the groove 260 is opened, and the surface 270 of the first sealing film 27 is a flat face. The first sealing film 27 is in an overhang state with respect to the groove 260, is provided on the outside of the groove 260, and is not provided on the inside of the groove 260. For this reason, the first sealing film 27 does not come into contact with side faces 261 and 262 of the groove 260. The first sealing film 27 is provided with a penetration portion 275 having an opening area smaller than that of the opening portion 265 of the groove 260 and communicating with the inside of the groove 260. In the embodiment, the penetration portion 275 is formed of a penetration hole formed in an area or the like interposed between the pixel electrodes 9a sides adjacent to each other (see FIG. 5B).

The second sealing film 28 is formed on the surface 270 of the first sealing film 27. The surface 280 of the second sealing film 28 is a flat face, and the common electrode 21 and the alignment film 29 are formed on the flat face. The second sealing film 28 is formed over the whole area where the first sealing film 27 is formed, and blocks the penetration portion 275 of the first sealing film 27.

As described above, the opening portion 265 of the groove 260 is blocked by the first sealing film 27 and the second sealing film 28, the inside of the groove 260 is hollow, and the inside of the groove 260 is vacuum or an air layer. In the embodiment, the inside of the groove 260 is vacuum. Accordingly, when the refractive index of a medium (vacuum) in the groove is compared with the refractive index of a medium (glass or the like) of the substrate body 20w, it is in the following relationship.

Refractive Index in Groove 260<Refractive Index of Substrate Body 20w

For this reason, the side faces 261 and 262 of the groove 260 serve as reflection faces. When the refractive index of the substrate body 20w is $n_{11}$, the refractive index in the groove 260 is $n_{12}$, and the incidence angle of the light with respect to the normal line of the side faces 261 and 262 is $\theta_1$, it is $n_{11} > n_{12}$. Meanwhile, when $n_{11}$, $n_{12}$, and $\theta_1$ satisfy the following formula $\sin\theta_1 > n_{12}/n_{11}$, total reflection occurs on the side faces 261 and 262. Since the inside of the groove 260 is in the vacuum state, $n_{12}$ is very small. Therefore, total reflection occurs over the broad angle range on the side faces 261 and 262. Since the first sealing film 27 and the second sealing film 28 are formed on the outside of the groove 260, the whole of the side faces 261 and 262 of the groove 260 are the reflection faces where the total reflection occurs in the broad angle range.

Operation and Effect of Reflection Portion 26

In the electro-optic device 100 configured as described above, the light at various incidence angles is input from the light source unit 130 described with reference to FIG. 1, the light directed to the pixel electrode 9a of the incidence light propagates as indicated by arrow L1. As indicated by the arrow L2, the light directed in a direction (direction directed to the inter-pixel area 10f) deviating from the pixel electrode 9a is reflected by the side faces 261 and 262 of the groove 260 and is directed to the pixel electrode 9a as indicated by the arrow L3.

The groove 260 has a substantially isosceles triangular cross section in which the side faces 261 and 262 are one side, and an apex of the triangle is positioned at the center of the width direction of the inter-pixel area 10f. The width dimension of the groove 260 is set to be substantially equal to the width dimension of the inter-pixel area 10f or slightly larger than the width dimension thereof. For this reason, the light directed in the direction drastically deviating from the pixel electrode 9a is reflected toward the pixel electrode 9a, and may be effectively used. Slopes of the side faces 261 and 262 are set, for example, such that the angle formed by the normal line with respect to the substrate face of the substrate body 20w is 10° or less, and 3° or less. According to such a configuration, when the light is reflected by the side faces 261 and 262, it is possible to change the direction of the incident light while reducing an increase of a light beam angle. In addition, it is possible to convert the incident light into light at a light beam angle capable of sufficiently capturing the incident light by a projective optical system (see FIG. 1) in which the F-number is 2.5. Therefore, it is possible to improve the contrast and to improve the brightness of the projection image.

Method of Producing Second Substrate 20

A process of producing the reflection portion 26 in a process of producing the electro-optic device 100 will be described with reference to FIG. 6A to FIG. 7C. FIG. 6A to FIG. 7C are diagrams illustrating the method of producing the electro-optic device 100 according to Embodiment 1 of the invention. FIG. 6A to FIG. 7C show that one face 20s of the second substrate 20 is upward contrary to FIG. 5A and FIG. 5B. As the other process other than the process described hereinafter, for example, a process of producing the first substrate 10 or a process of bonding the first substrate 10 and the second substrate 20, the known method may be employed, and thus it is not described.

Figure 6A:
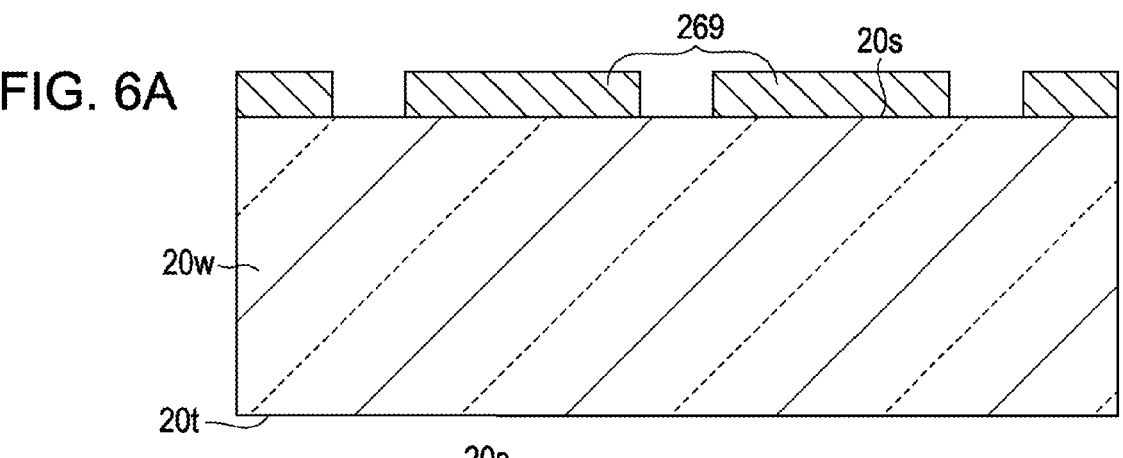
FIG. 6A to FIG. 6D are diagrams illustrating a method of producing the electro-optic device according to Embodiment 1 of the invention.

To produce the second substrate 20 of the embodiment, in the process of forming the grooves shown in FIG. 6A, first, a mask 269 with a thickness of 5 to 10 μm is formed on one face 20s of the substrate body 20w using a photolithography technique. In the embodiment, the mask 269 is a hard mask formed of a metal material of titanium or titanium compound.

Figure 6B:
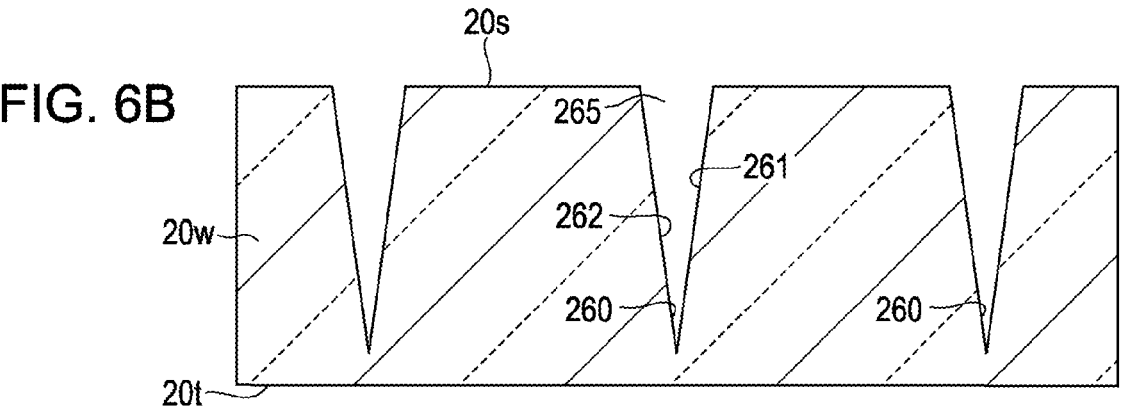

Then, dry etching is performed on the substrate body 20w. In the dry etching, an etching selection ratio of the substrate body 20w and the mask is for example, 4 or more:1, using an ICP (ICP-RIE/Inductive Coupled Plasma-RIE) dry etching device capable of forming high-density plasma. As a result, as shown in FIG. 6B, the groove 260 in a cross-sectional V shape having a depth four times or more the thickness of the mask 269 is formed. In the embodiment, the depth of the groove 260 is about 25 μm. In the groove 260, the side faces 261 and 262 are inclination faces. In the process, gas obtained by mixing fluorine-based gas with oxygen or carbon monoxide is used as the etching gas.

Figure 6C:
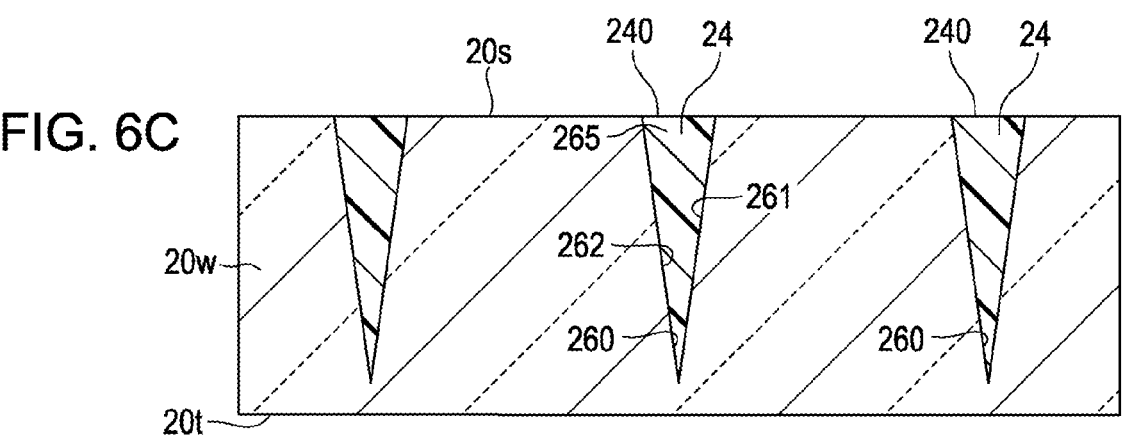

Then, in the sacrificial film forming process shown in FIG. 6C, the inside of the groove 260 is filled with a sacrificial film 24 formed of a resin material, and the inside of the groove 260 is plugged up by the sacrificial film 24. In the embodiment, the sacrificial film 24 is provided such that the surface 240 of the sacrificial film 24 and one face 20s of the substrate body 20w constitute a continuous flat face. The configuration may be realized, for example, by applying a resin material to one face 20s of the substrate body 20w by a spin coat method or the like, and then removing the resin material from the outside of the groove 260 before curing the resin material or after curing the resin material. For example, the resin material is applied to one face 20s of the substrate body 20w by the spin coat method or the like, then the resin material is cured, and then the resin material is removed from the outside of the groove 260 by dry etching or polishing. As the polishing, chemical mechanical polishing may be used. In the chemical mechanical polishing, it is possible to obtain a smooth polished face at a high speed by action of chemical components included in the polishing liquid and relative movement of a polishing agent and the second substrate 20 (substrate body 20w). More specifically, with respect to the polishing device, polishing is performed while relatively rotating a platen to which a polishing cloth (pad) formed of nonwoven fabric, foamed polyurethane, porous fluorine resin, or the like is attached, and a holder holding the second substrate 20. In this case, for example, the polishing agent including cerium oxide particles with an average diameter of 0.01 to 20 μm, acrylic acid ester derivatives as a dispersing agent, and water is supplied between the polishing cloth and the second substrate 20.

Figure 6D:
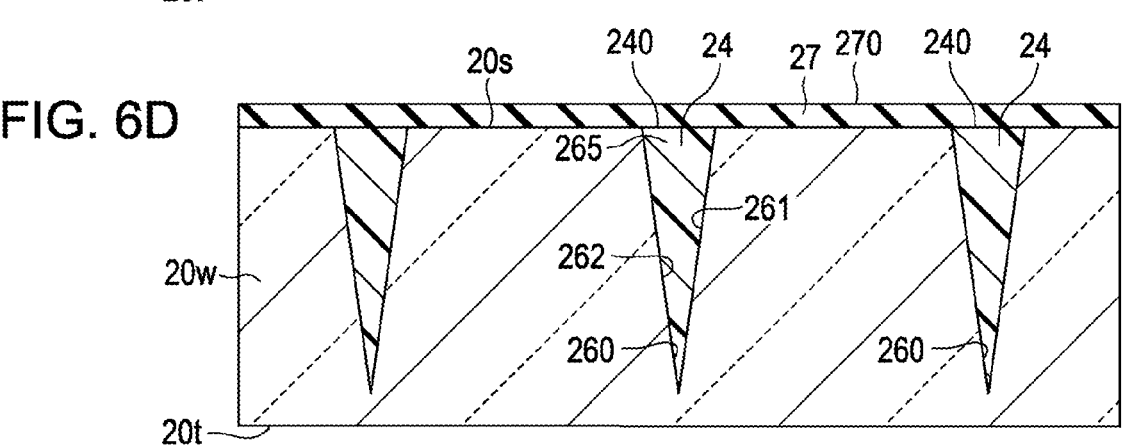

Then, in the first sealing film forming process shown in FIG. 6D, the first sealing film 27 is formed on one face 20s of the substrate body 20w and the surface 240 of the sacrificial film 24. The first sealing film 27 formed of a silicon oxide film is formed, for example, according to the CVD method.

Figure 7A:
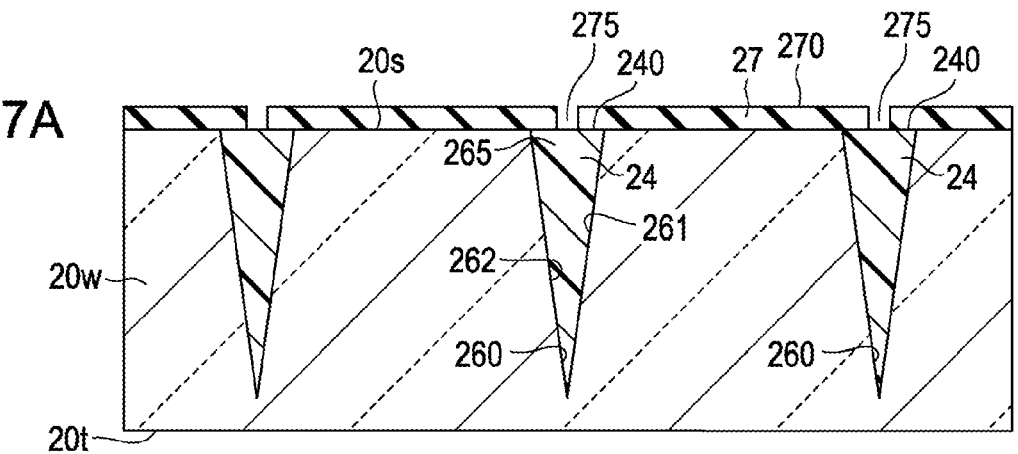
FIG. 7A to FIG. 7C are diagrams illustrating a method of producing the electro-optic device according to Embodiment 1 of the invention.

Then, in the penetration portion forming process shown in FIG. 7A, the penetration portion 275 with an opening area smaller than that of the opening portion 265 of the groove 260 is formed at the position overlapped with the sacrificial film 24 of the first sealing film 27 by a photolithography process and an etching process.

Figure 7B:
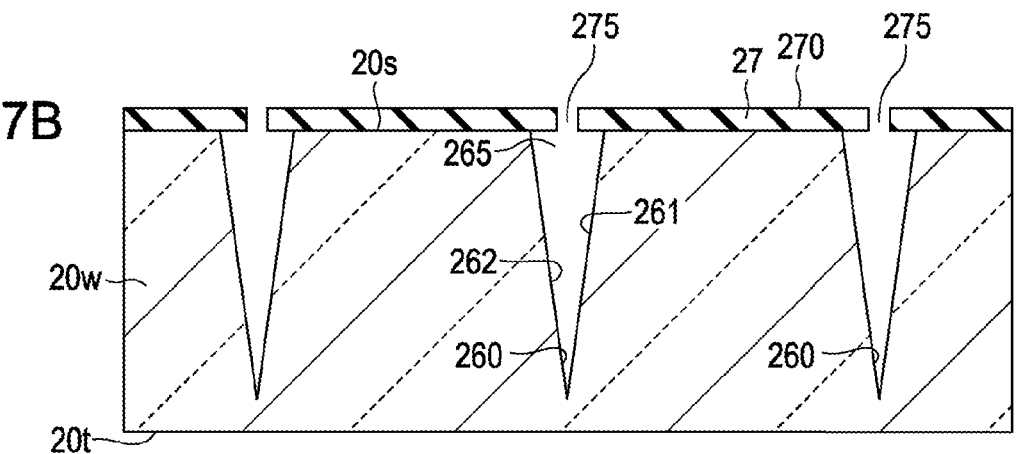

Then, in the sacrificial film removing process shown in FIG. 7B, the sacrificial film 24 is removed through the penetration portion 275, and the inside of the groove 260 is made hollow. In the process, the sacrificial film 24 formed of a resin material is removed by dry etching using oxygen plasma. Alternatively, the sacrificial film 24 formed of the resin material is removed by wet etching using sulfuric-based etching liquid.

Figure 7C:
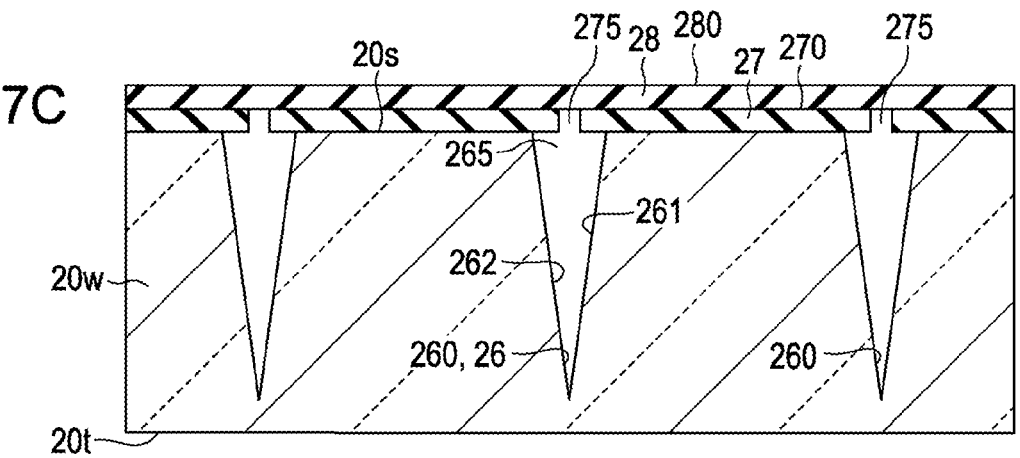

Then, in the second sealing film forming process shown in FIG. 7C, the second sealing film 28 is formed on the surface 270 of the first sealing film 27. For example, according to the CVD method, the second sealing film 28 formed of a silicon oxide film is formed. As a result, the penetration portion 275 of the first sealing film 27 is blocked by the second sealing film 28, and the inside of the groove 260 is sealed in the hollow state. The second sealing film 28 is formed in a vacuum atmosphere. For this reason, at the time point when the second sealing film 28 is formed and sealing of the groove 260 is completed, the inside of the groove 260 is sealed in the vacuum state.

Then, as shown in FIG. 5A, the common electrode 21 and the alignment film 29 are sequentially formed on the surface 280 of the second sealing film 28, thereby obtaining the second substrate 20.

Main Effect of Embodiment

As described above, in the electro-optic device 100 of the embodiment, in the second substrate 20, the first sealing film 27 and the second sealing film 28 are formed on the face (one face 20s of the substrate body 20w) to which the groove 260 is opened, and the groove 260 is hollow. For this reason, the side faces 261 and 262 of the hollow groove 260 are the reflection faces caused by the difference in refractive index between the medium (air and vacuum) in the groove 260 and the medium of the second substrate 20. Accordingly, in the second substrate 20, the light which tends to be directed to the space (the inter-pixel area 10f) between the pixel electrodes 9a is reflected by the side faces 261 and 262 of the groove 260, and thus it is possible to guide the light to the pixel electrode 9a. Therefore, the ratio of the light contributing to the display or the like is high.

The first sealing film 27 is provided with the penetration portion 275 having an opening area smaller than the opening portion 265 of the groove 260 and communicating with the inside of the groove. Accordingly, before forming the first sealing film 27, the sacrificial film 24 is formed in the groove 260, the first sealing film 27 is formed, and then it is possible to remove the sacrificial film 24 through the penetration portion 275. For this reason, it is possible to form the first sealing film 27 to block the opening portion 265 of the groove 260, and it is possible to prevent the first sealing film 27 from being formed up to the inside of the groove 260. Since the sacrificial film 24 is removed, the part coming in contact with the sacrificial film 24 on the side faces 261 and 262 of the groove 260 also serves as a reflection face. Therefore, it is possible to use the side faces 261 and 262 of the groove 260 as the reflection faces over a broad area. The opening area of the penetration portion 275 formed in the first sealing film 27 is smaller than that of the opening portion 265 of the groove 260, and thus it is possible to block the penetration portion 275 of the first sealing film 27 by the second sealing film 28 when the second sealing film 28 is formed on the first sealing film 27. For this reason, by the forming the film (forming the first sealing film 27 and the second sealing film 28), it is possible to make the inside of the groove 260 hollow by blocking the opening portion 265 of the groove 260. With such a configuration, productivity is high as compared with a case of bonding the cover glass to block the opening portion.

The first sealing film 27 is provided on the outside of the groove 260, and is not provided in the groove 260. For this reason, it is possible to avoid that the part coming in contact with the first sealing film 27 on the side faces 261 and 262 of the groove 260 does not serve as the reflection faces.

The first sealing film 27 and the second sealing film 28 are formed of a transparent insulating film, and thus it is possible to direct the light propagating to the first sealing film 27 and the second sealing film 28, to the pixel electrodes 9a.

In the embodiment, the groove 260 has the cross-sectional V shape in which the side faces 261 and 262 are inclined toward the inter-pixel area 10f. For this reason, the light which tends to be directed to the inter-pixel area 10f is reflected by the side faces 261 and 262 of the groove 260, and it is possible to efficiently direct the light to the pixel electrodes 9a. Since the inside of the groove 260 is vacuum, the side faces 261 and 262 may be the reflection faces with high reflectance. Therefore, the light quantity of the display light is large, and thus it is possible to display a bright image. In the configuration in which the inside of the groove 260 is in the vacuum state, there is an advantage that the configuration may be realized when the second sealing film 28 is formed in the vacuum atmosphere.

Modification Example of Embodiment 1

In the embodiment, the resin material is used as the sacrificial film 24, but the sacrificial film 24 may be formed by an inorganic material such as a silicon film and a metal film.

Embodiment 2

Configuration of Reflection Portion 26

Figure 8A:
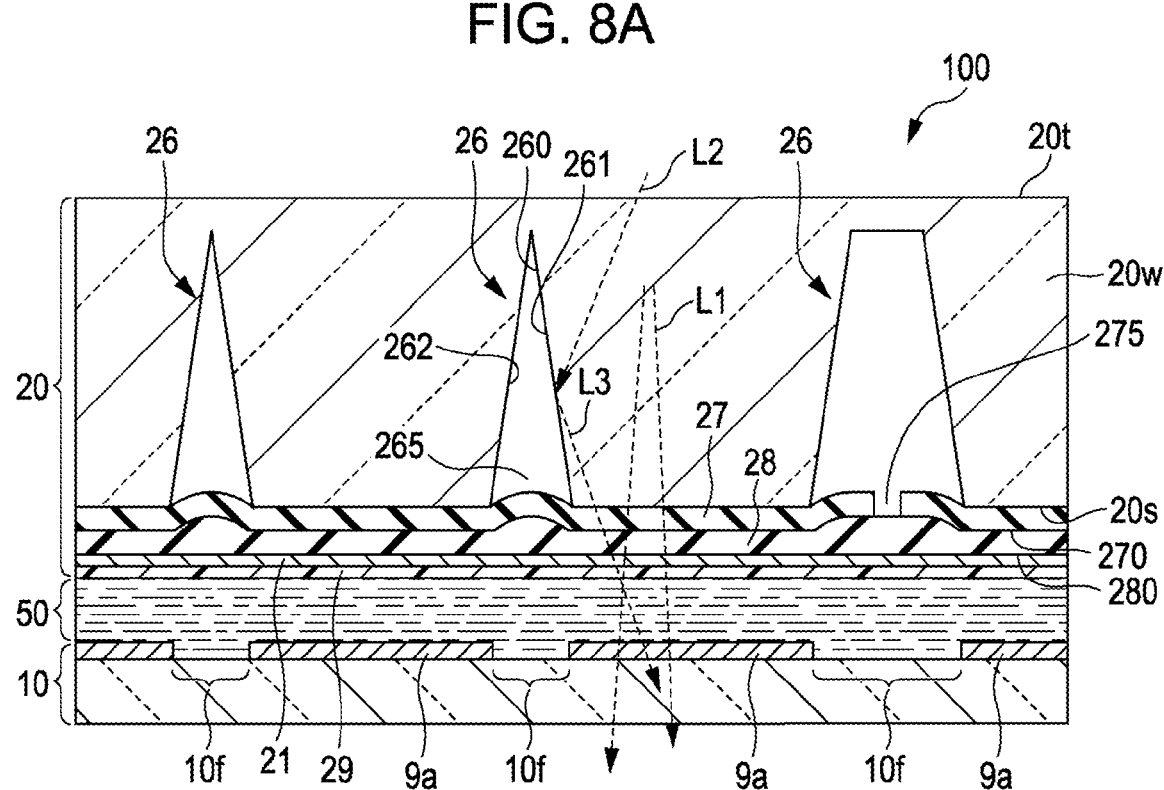
FIGS. 8A and 8B are diagrams illustrating a reflection portion formed on a second substrate of an electro-optic device according to Embodiment 2 of the invention.
Figure 8B:
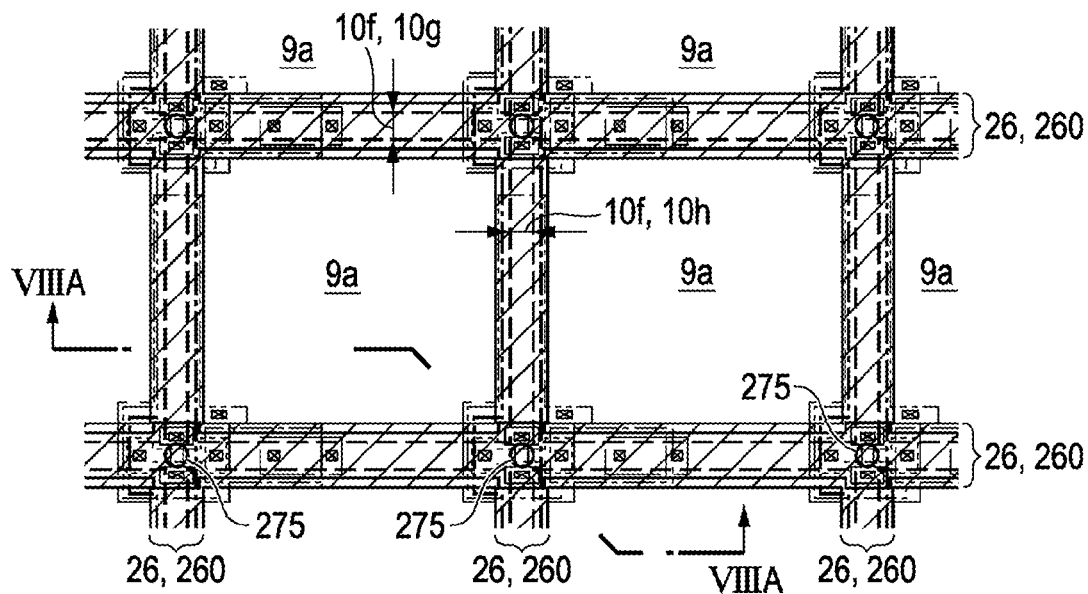

FIG. 8A and FIG. 8B are diagrams illustrating the reflection portion formed on the second substrate 20 of the electro-optic device 100 according to Embodiment 2 of the invention, and FIG. 8A and FIG. 8B are a cross-sectional view of the second substrate 20, and a diagram illustrating a plan configuration of the reflection portion. FIG. 8A corresponds to the cross-section of VIIIA-VIIIA of FIG. 8B. A basic configuration of the embodiment is the same as that of the Embodiment 1, the same reference numerals and signs are given to the common parts, and the description thereof is not repeated.

As shown in FIG. 8A and FIG. 8B, also in the electro-optic device 100 according to the embodiment, similar to Embodiment 1, the reflection portion 26 reflecting the light which tends to be directed to the space (the inter-pixel area 10f) between the pixel electrodes 9a of the light input from the second substrate 20 side, to the pixel electrode 9a is formed. Also in the embodiment, similar to Embodiment 1, the reflection portion 26 is provided with the lattice-shaped grooves 260 extending along the area overlapped with the space (the inter-pixel area 10f) of the pixel electrodes 9a in the plan view on one face 20s side of the substrate body 20w (transparent substrate) of the second substrate 20, and the groove 260 is opened to the inter-pixel area 10f. In the embodiment, the side faces 261 and 262 of the groove 260 opposed to each other are inclined to the inter-pixel area 10f, and the groove 260 has the cross-sectional V shape. The opening portion 265 of the groove 260 is blocked by the first sealing film 27 and the second sealing film 28 formed on one face 20s of the substrate body 20w, and the inside of the groove 260 is hollow. In the embodiment, both of the first sealing film 27 and the second sealing film 28 are formed of a transparent insulating film such as a silicon oxide film.

The first sealing film 27 is formed to block the opening portion 265 on one face 20s of the substrate body 20w to which the groove 260 is opened. In the embodiment, the part of the first sealing film 27 overlapped with the groove 260 is recessed toward the groove 260, and thus a part of the first sealing film 27 is positioned in the groove 260. However, the first sealing film 27 is in the overhang state with respect to the groove 260, and does not come into contact with the side faces 261 and 262 of groove 260. The first sealing film 27 is provided with the penetration portion 275 having an opening area smaller than that of the opening portion 265 of the groove 260 and communicating with the groove 260. In the embodiment, the penetration portion 275 is a penetration opening (see FIG. 8B) formed at the part where the inter-pixel areas 10f intersect.

In the embodiment, on the surface 270 of the first sealing film 27, the part overlapped with the groove 260 is recessed toward the groove 260. The second sealing film 28 is formed on the surface 270 of the first sealing film 27, and the surface 280 of the second sealing film 28 is planarized by polishing or the like. Accordingly, the common electrode 21 and the alignment film 29 are formed on the flat surface 280 of the second sealing film 28. The second sealing film 28 is formed over the whole area where the first sealing film 27 is formed, and blocks the penetration portion 275 of the first sealing film 27.

As described above, the opening portion 265 of the groove 260 is blocked by the first sealing film 27 and the second sealing film 28, the inside thereof is hollow, and the inside of the groove 260 is vacuum or an air layer. The whole side faces 261 and 262 of the groove 260 are reflection faces on which the total reflection occurs in the broad angle range.

Method of Producing Second Substrate 20

A process of producing the reflection portion 26 in a process of producing the electro-optic device 100 will be described with reference to FIG. 9A to FIG. 10D. FIG. 9A to FIG. 10D are diagrams illustrating the method of producing the electro-optic device 100 according to Embodiment 2 of the invention. FIG. 9A to FIG. 10D show that one face 20s of the second substrate 20 is upward contrary to FIG. 8A and FIG. 8B. As the other processes other than the process described hereinafter, for example, a process of producing the first substrate 10 or a process of bonding the first substrate 10 and the second substrate 20, a known method may be employed, and thus it is not described.

To produce the second substrate 20 of the embodiment, first, the groove 260 opened to one face 20s of the substrate body 20w is formed as shown in FIG. 9A by the groove forming process described with reference to FIG. 6A to FIG. 7C.

Then, the sacrificial film forming process shown in FIG. 9B to FIG. 9D is performed to block the opening portion 265 of the groove 260 by the sacrificial film 25. More specifically, first, in the metal film forming process shown in FIG. 9B, the sacrificial film 25 formed of the metal film is formed on the whole face of one face 20s of the substrate body 20w by sputtering. In the embodiment, an aluminum-based metal film is formed as the sacrificial film 25. At the time of forming the film, the sacrificial film 25 is deposited on one face 20s of the substrate body 20w, and the film is formed to project from the opening protrusion of the groove 260 to the inside in the area overlapped with the groove 260. For this reason, the sacrificial film 25 is not deeply formed up to the inside of the groove 260. Even when the sacrificial film 25 is formed to project from the opening protrusion of the groove 260 to the inside, the opening portion 255 is formed in the area overlapped with the opening portion 265 of the groove 260 with respect to the sacrificial film 25. Accordingly, only by forming the sacrificial film 25, the opening portion 265 of the groove 260 is not blocked.

Then, in the heating process shown in FIG. 9C, the sacrificial film 25 is melted by heating to block the opening portion 255 (see FIG. 9B) of the sacrificial film 25. As a result, the opening portion 265 of the groove 260 is blocked by the sacrificial film 25, and the inside of the groove 260 is hollow. In the embodiment, since the sacrificial film 25 is formed of the aluminum-based metal film, a heating temperature is 650 to 700° C.

Then, in the metal film removing process, shown in FIG. 9D, a part of the sacrificial film 25 formed on the outside of the groove 260 is removed, and a part for blocking the opening portion 265 is allowed to remain in the groove 260. Accordingly, the opening portion 265 of the groove 260 is blocked by the sacrificial film 25, and the inside of the groove 260 is hollow. In the embodiment, reactive ion etching is performed using etching gas including chlorine. As a result, the surface 250 of the sacrificial film 25 is a concave face recessed from one face 20s of the substrate body 20w toward the grooved 260.

Figure 10A:
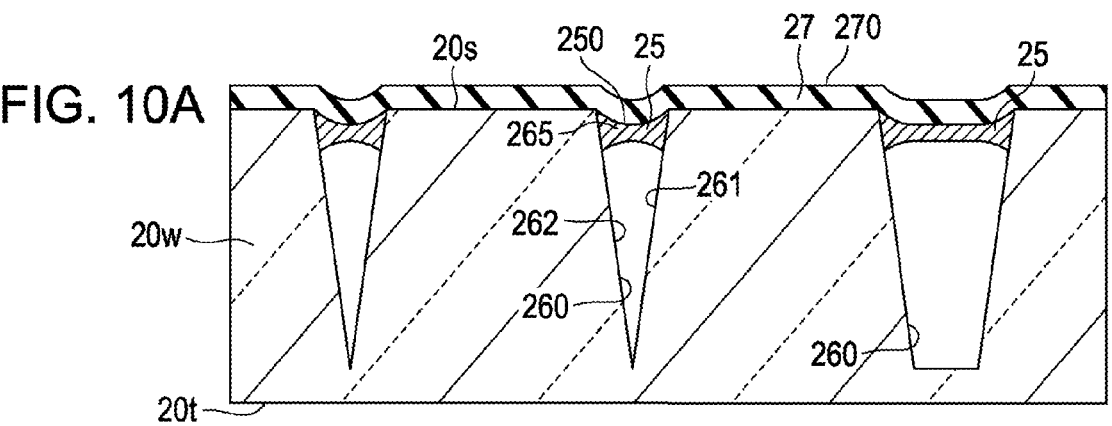
FIG. 10A to FIG. 10D are diagrams illustrating a method of producing the electro-optic device according to Embodiment 2 of the invention.

Then, in the first sealing film forming process shown in FIG. 10A, the first sealing film 27 is formed on one face 20s of the substrate body 20w and on the surface 250 of the sacrificial film 25. For example, according to the CVD method, the first sealing film 27 formed of a silicon oxide film is formed.

Figure 10B:
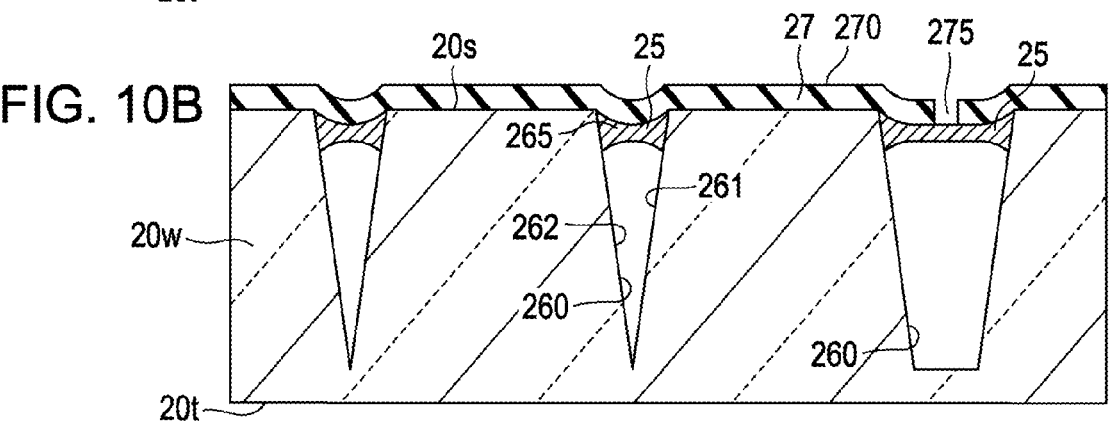

Then, in the penetration portion forming process shown in FIG. 10B, the penetration portion 275 having an opening area smaller than that of the opening portion 265 of the groove 260 is formed at the position overlapped with the sacrificial film 25 of the first sealing film 27 by the photolithography process and the etching process. In the embodiment, as shown in FIG. 8B, the penetration portion 275 is formed at the part where the inter-pixel areas 10f intersect.

Figure 10C:
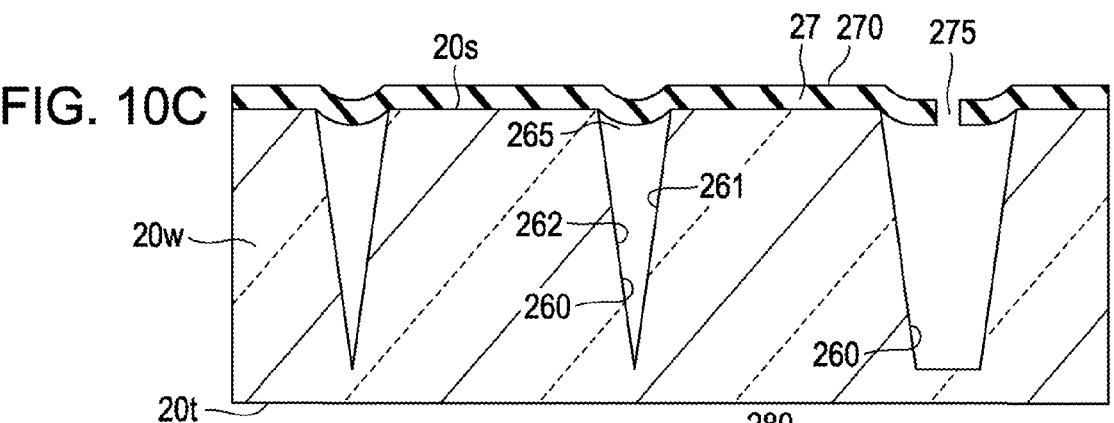

Then, in the sacrificial film removing process shown in FIG. 10C, the sacrificial film 25 is removed through the penetration portion 275, and the inside of the groove 260 is made hollow. In the process, the sacrificial film 25 formed of the aluminum-based metal is removed by dry etching using the etching gas including chlorine. Alternatively, the sacrificial film 25 formed of the aluminum-based metal is removed by wet etching using chlorine-based etching liquid.

Figure 10D:
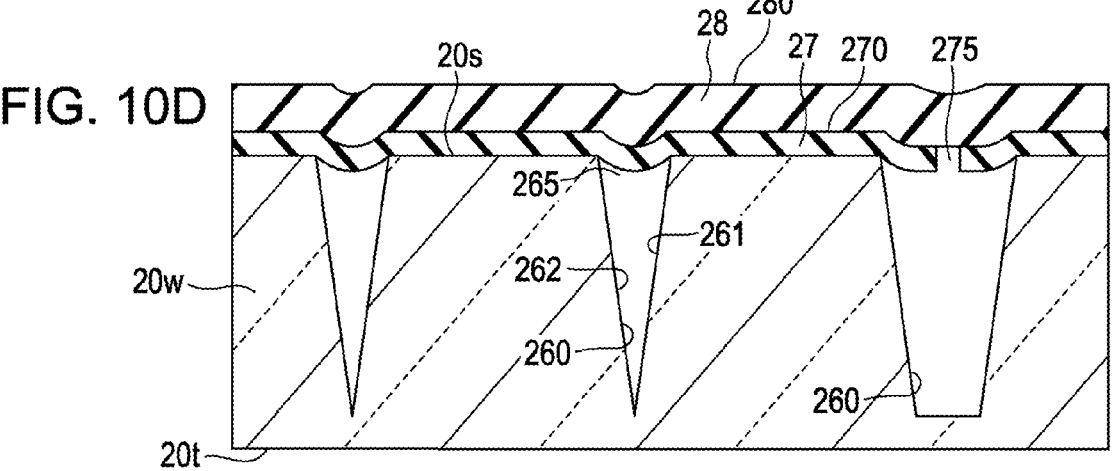

Then, in the second sealing film forming process shown in FIG. 10D, the second sealing film 28 is formed on the surface 270 of the first sealing film 27. For example, according to the CVD method, the second sealing film 28 formed of a silicon oxide film is formed. As a result, the penetration portion 275 of the first sealing film 27 is blocked by the second sealing film 28, and the inside of the groove 260 is sealed in the hollow state. The second sealing film 28 is formed in a vacuum atmosphere. For this reason, at the time point when the second sealing film 28 is formed and the sealing of the groove 260 is completed, the inside of the groove 260 is sealed in the vacuum state.

Then, the surface of the second sealing film 28 is planarized by polishing or the like, and then the common electrode 21 and the alignment film 29 are sequentially formed on the surface 280 of the second sealing film 28, thereby obtaining the second substrate 20.

Main Effect of Embodiment

As described above, the electro-optic device 100 of the embodiment also has the same configuration as that of Embodiment 1, and thus the same effect as that of the Embodiment 1 is obtained. For example, in the second substrate 20, the first sealing film 27 and the second sealing film 28 are formed on the face (one face 20s of the substrate body 20w) to which the groove 260 is opened, and the groove 260 is hollow. Accordingly, the light which tends to be directed to the space (the inter-pixel area 10f) between the pixel electrodes 9a is reflected by the side faces 261 and 262 of the groove 260, and thus it is possible to guide the light to the pixel electrode 9a. The first sealing film 27 is provided with the penetration portion 275 having the opening area smaller than the opening portion 265 of the groove 260 and communicating with the inside of the groove. Accordingly, before forming the first sealing film 27, the sacrificial film 25 is formed in the groove 260, the first sealing film 27 is formed, and then it is possible to remove the sacrificial film 25 through the penetration portion 275. For this reason, it is possible to form the first sealing film 27 to block the opening portion 265 of the groove 260, and it is possible to prevent the first sealing film 27 from being formed up to the inside of the groove 260. Since the sacrificial film 25 is removed, the part coming in contact with the sacrificial film 25 on the side faces 261 and 262 of the groove 260 also serves as a reflection face. Therefore, it is possible to use the side faces 261 and 262 of the groove 260 as the reflection faces over a broad area. The opening area of the penetration portion 275 formed in the first sealing film 27 is smaller than that of the opening portion 265 of the groove 260, and thus it is possible to block the penetration portion 275 of the first sealing film 27 by the second sealing film 28 when the second sealing film 28 is formed on the first sealing film 27. For this reason, by the forming the film (forming the first sealing film 27 and the second sealing film 28), it is possible to make the inside of the groove 260 hollow by blocking the opening portion 265 of the groove 260. With such a configuration, productivity is high as compared with a case of bonding the cover glass to block the opening portion.

Modification Example of Embodiment 2

In the embodiment, in the metal film removing process, the sacrificial film 25 (metal film) on the outside of the groove 260 is removed by the etching, but the sacrificial film 25 (metal film) on the outside of the groove 260 may be removed by polishing such as chemical mechanical polishing.

In Embodiments 1

Other Embodiment and 2, the first substrate 10 and the pixel electrode 9a have transparency. However, the invention may be applied to a reflection type electro-optic device 100 in which the pixel electrode 9a is formed of a reflective metal film.

In Embodiments 1 and 2, the inside of the groove 260 is vacuum, but may be filled with the air or the like.

In Embodiments 1 and 2, the light is input from the second substrate 20 side, and thus the reflection portion 26 is formed on the substrate body 20w of the second substrate 20. However, when the light is input from the first substrate 10 side, the invention may be applied to a case where the reflection portion 26 is formed on the substrate body 10w of the first substrate 10.

In FIG. 1, a projection type display apparatus 110 using three light valves is exemplified. However, the invention may be applied to a case where the electro-optic device 100 is provided therein with a color filter or to an electro-optic device 100 used in a projection type display apparatus in which light with colors is sequentially input to one electro-optic device 100.

In the embodiment, as the electro-optic device, the transmission type electro-optic device 100 used in the projection type display apparatus is exemplified. However, the invention may be applied to a direct view type electro-optic device 100 which displays an image using light output from a backlight device as incident light.

In the embodiment, a liquid crystal device is exemplified as the electro-optic device 100. However, the invention may be applied to a case of forming a reflection portion 26 (the groove 260) to increase display light quantity in an electrophoretic type display device. The invention may be applied to a case of forming a reflection portion 26 to suppress a mixed color or the like in an electro-optic device which displays an image on an image display face by modulation light output from a self-light emitting element, such as an organic electroluminescence device.

The entire disclosure of Japanese Patent Application No. 2011-159621, filed Jul. 21, 2011 is expressly incorporated by reference herein.

What is claimed is:

1. An electro-optic device comprising:
   a first substrate that is provided with a plurality of pixel electrodes and a plurality of switching elements;
   a second substrate that is opposed to the first substrate; and
   an electro-optic material layer that is provided between the first substrate and the second substrate,
   wherein one substrate of the first substrate and the second substrate is a transparent substrate, and
   wherein the one substrate is provided with a groove, an opening portion of the groove is directed to a space between one of the plurality of pixel electrodes and another one of the plurality of pixel electrodes that is adjacent to the one of the plurality of pixel electrodes, the groove being hollow, a first sealing film is disposed so as to block the opening portion of the groove, the first sealing film being provided with a penetration portion having an opening area smaller than an area of the opening portion, the penetration portion being hollow and communicating with an inside of the groove, and a second sealing film is disposed on the first sealing film to block the penetration portion.

2. The electro-optic device according to claim 1, wherein the first sealing film is in an overhang state with respect to the groove.

3. The electro-optic device according to claim 1, wherein the first sealing film and the second sealing film are transparent insulating films.

4. The electro-optic device according to claim 1, wherein side faces of the groove are inclination faces inclined to the space between one of the plurality of pixel electrodes and another one of the plurality of pixel electrodes that is adjacent to the one of the plurality of the pixel electrodes.

5. The electro-optic device according to claim 1, wherein the inside of the groove is in a vacuum state.

6. The electro-optic device according to claim 1, wherein the groove is disposed on one side of the second substrate.

7. The electro-optic device according to claim 6, wherein the plurality of pixel electrodes and the first substrate have transparency.

8. A method of producing an electro-optic device, comprising:
   forming a groove to one of a first substrate and a second substrate, wherein the first substrate is provided with a plurality of pixel electrodes and a plurality of switching elements, wherein the second substrate is opposed to the first substrate, an opening portion of the groove is directed to a space between one of a plurality of pixel electrodes and another of the plurality of pixel electrodes adjacent to the one of the plurality of pixel electrodes on one substrate;
   forming a sacrificial film blocking the opening portion of the groove;
   forming a first sealing film on the sacrificial film;
   forming a penetration portion of the first sealing film with an opening area smaller than an area of the sacrificial film;
   removing the sacrificial film through the penetration portion; and
   forming a second sealing film on the first sealing film to block the penetration portion, the penetration portion being hollow.

9. The method of producing the electro-optic device according to claim 8, wherein the forming of the sacrificial film includes filling with a resin material to the groove.

10. The method of producing the electro-optic device according to claim 8, wherein the forming of the sacrificial film includes forming a metal film on a face to which the groove is opened, melting the metal film by heating to block the opening portion of the groove by the metal film, removing a part of the metal film formed on the outside of the groove, and remaining a part of the metal film blocking the opening portion in the groove.

11. A projection type display apparatus using the electro-optic device according to claim 1, comprising:
- a light source unit that outputs the light input from one substrate side to the electro-optic device; and
- a projective optical system that performs projection of the light modulated by the electro-optic device.

12. An electro-optic device comprising:
- a transparent substrate including a display area in which a plurality of pixels are arranged;
- a first sealing film that is disposed on a first side of the transparent substrate; and
- a second sealing film that is disposed above the first sealing film,
- wherein
  - the transparent substrate has a groove that is disposed between a first pixel and a second pixel, the first pixel being one of the plurality of pixels and the second pixel being adjacent to the first pixel,
  - the first sealing film has an penetration portion that is positioned in the groove when viewed from plan view,
  - the second sealing film is disposed so as to overlap with the penetration portion, and
  - the groove and the penetration portion are hollow.

13. The electro-optic device according to claim 12, wherein the first sealing film is in an overhang state with respect to the groove.

14. The electro-optic device according to claim 12, wherein the first sealing film and the second sealing film are transparent insulating films.

15. The electro-optic device according to claim 12, wherein side faces of the groove are inclined.

16. The electro-optic device according to claim 12, wherein the inside of the groove is in a vacuum state.

17. The electro-optic device according to claim 12, wherein each of the plurality of pixels has a transparent pixel electrode.

18. A projection type display apparatus using the electro-optic device according to claim 12, comprising:
- a light source unit that outputs the light input from one side to the electro-optic device; and
- a projective optical system that perform projection of the light modulated by the electro-optic device.

* * * * *